United States Patent
Goetz et al.

(10) Patent No.: US 10,828,994 B2
(45) Date of Patent: Nov. 10, 2020

(54) BATTERY SYSTEM WITH BATTERY CONTROL

(71) Applicant: Dr. Ing. h.c. F. Porsche Aktiengesellschaft, Stuttgart (DE)

(72) Inventors: Stefan Goetz, Forstern (DE); Ralf Bauer, Neckarsulm (DE); Harald Schoeffler, Obersulm-Eschenau (DE); Juergen Mittnacht, Grafenau (DE)

(73) Assignee: Dr. Ing. h.c. F. Porsche Aktiengesellschaft, Stuttgart (DE)

( * ) Notice: Subject to any disclaimer, the term of this patent is extended or adjusted under 35 U.S.C. 154(b) by 371 days.

(21) Appl. No.: 15/095,409

(22) Filed: Apr. 11, 2016

(65) Prior Publication Data

US 2016/0318411 A1  Nov. 3, 2016

(30) Foreign Application Priority Data

Apr. 30, 2015 (DE) .................. 10 2015 106 773

(51) Int. Cl.
*B60L 53/00* (2019.01)
*H02J 1/00* (2006.01)
(Continued)

(52) U.S. Cl.
CPC ............... *B60L 53/00* (2019.02); *B60L 58/12* (2019.02); *B60L 58/20* (2019.02); *H02J 1/00* (2013.01); *H02J 1/082* (2020.01)

(58) Field of Classification Search
CPC .............. B60L 11/1809; B60L 11/1861; B60L 11/1868; B60L 53/00; B60L 58/12; B60L 58/20; H02J 1/00
(Continued)

(56) References Cited

U.S. PATENT DOCUMENTS

| 4,818,928 | A |   | 4/1989 | Schosser |
| 5,567,996 | A | * | 10/1996 | Yu ................ H02J 9/062 307/125 |

(Continued)

FOREIGN PATENT DOCUMENTS

| DE | 102011077708 A1 | 12/2012 |
| DE | 102011077719 A1 | 12/2012 |

(Continued)

OTHER PUBLICATIONS

Korean Office Action.
(Continued)

*Primary Examiner* — Rexford N Barnie
*Assistant Examiner* — Swarna N Chowdhuri
(74) *Attorney, Agent, or Firm* — Gerald E. Hespos; Michael J. Porco; Matthew T. Hespos

(57) ABSTRACT

A battery system (10) has at least one battery (9) with a plurality of battery elements (1, 2, 24, n), a regulating or control unit (12) and a switching unit (3) with at least one switching element (6). The regulating or control unit (12) is configured to instruct the switching unit (3) to dynamically switch the at least one switching element (6) over time such that battery elements (1, 2, 24, n) from at least one accordingly dynamically changing subset of the plurality of battery elements (1, 2, 24, n) are connected, and a respective voltage level to be provided is provided thereby for the plurality of load consumers. In addition to providing a plurality of voltage levels, the battery elements (1, 2, 24, n) are deliberately loaded.

18 Claims, 16 Drawing Sheets

(51) Int. Cl.
*B60L 58/12* (2019.01)
*B60L 58/20* (2019.01)
*H02J 1/08* (2006.01)

(58) Field of Classification Search
USPC .................................................. 307/108, 18
See application file for complete search history.

(56) References Cited

U.S. PATENT DOCUMENTS

| | | | |
|---|---|---|---|
| 5,710,504 | A | 1/1998 | Pascual |
| 6,064,178 | A | 5/2000 | Miller |
| 6,497,974 | B2* | 12/2002 | Fuglevand ........ H01M 8/04567 429/432 |
| 2009/0079384 | A1 | 3/2009 | Harris |
| 2011/0267005 | A1* | 11/2011 | Gollob .................. H02J 7/0014 320/116 |
| 2012/0007557 | A1 | 1/2012 | Hayashigawa |
| 2012/0091731 | A1 | 4/2012 | Nelson |
| 2012/0200242 | A1 | 8/2012 | Grady |
| 2013/0127400 | A1 | 5/2013 | Oh |
| 2013/0200848 | A1* | 8/2013 | Ozawa .................. H02J 7/0019 320/112 |
| 2014/0077594 | A1 | 3/2014 | Bergfjord |
| 2014/0117763 | A1 | 5/2014 | Tiefenbach |

FOREIGN PATENT DOCUMENTS

| | | |
|---|---|---|
| DE | 102014006772 A1 | 11/2015 |
| KR | 20100005746 A | 1/2010 |
| KR | 20130033620 A | 4/2013 |
| WO | 2012121648 A1 | 9/2012 |

OTHER PUBLICATIONS

Review of High Power Isolated Bi-Directional DC-DC Coverters for PHEV/EW DC Charging Infrastructure.
Mproved Performance of Serially Connected Li-Ion Batteries With Active Cell Balancing in Electric Vehicles.
A Modularized Charge Equalizer for an HEV Lithium-Ion Battery String.
Review of Batery Charger Topologies, Charging Power Levels, and Infrastructure for Plug-In Electric Vehicles.
German Search Report dated Nov. 30, 2015.

* cited by examiner

BATTERY SYSTEM WITH BATTERY CONTROL

CROSS REFERENCE TO RELATED APPLICATION

This application claims priority under 35 USC 119 to German Patent Appl. No. 10 2015 106 773.0 filed on Apr. 30, 2015, the entire disclosure of which is incorporated herein by reference.

BACKGROUND

1. Field of the Invention

The invention relates generally to a battery system for power supply applications and specifically to a battery system for use in the electrical system of a vehicle, and to regulation or control of the battery system.

2. Description of the Related Art

Conventional motor vehicles with an internal combustion engine use at least one low-voltage vehicle electrical system, for example with a voltage of approximately 12 volts (V), for control devices and other electrical units. On account of higher power requirements, a higher voltage level around approximately 48 V is currently established in commercial vehicles and recent models of motor vehicles.

In electric vehicles, including electric hybrid vehicles and battery-electric vehicles, such low voltages are generally not sufficient to supply power to the electrical drive. For this reason, the electrical drive is supplied with voltages of up to currently usually 400 V. A voltage of 400 V is generally provided by a so-called high-voltage store, usually a battery in the form of a certain number of secondary cells without restricting generality. The low-voltage vehicle electrical system for the other electrical loads is usually not replaced in this case. However, it is appropriate to at least partially supply or support it with energy from the high-voltage store in order to either reduce or completely eliminate other energy stores, for example capacitors or batteries, in the vehicle electrical system. Furthermore, energy may also be transmitted from one or more vehicle electrical systems to the high-voltage side in order to enable a so-called limp-home capability, for example in the case of an empty battery, that is to say to still transport the vehicle to the next recharging possibility or to start the internal combustion engine via an electrical machine in the case of hybrid vehicles.

The situation is made more difficult in electrical commercial vehicles, sports cars and racing vehicles. Electrical drive powers of more than 250 kilovolt amperes (kVA) can be provided with high-voltage levels of 400 V and less only with high losses. In such vehicles, operation is carried out with higher voltages, for example 800 V or 1200 V. However, these voltages have hitherto not been established or standardized in vehicle construction. For this reason, not all required electrical loads of a vehicle are available at this voltage level or are compatible therewith. For some devices, such high voltages are also fundamentally not optimal or are not advisable for safety reasons. Electrical loads which are accordingly not available for the increased high voltage must accordingly be operated either on one of the low-voltage vehicle electrical systems, provided that their high power requirement is not opposed to this, or even at an additional voltage level. This additional voltage level is likewise supplied in this case with energy from one of the other existing voltage levels by means of voltage converters.

The increasing number of voltage levels and the increasing power requirement of electrical loads in vehicles require cost-intensive voltage converters for energy exchange. Furthermore, such voltage converters increase the vehicle weight.

The prior art makes it possible to supply the different voltage levels from an individual voltage level or to exchange energy between the voltage levels using voltage converters and, in particular, DC-DC converters. Such DC-DC converters disadvantageously have an efficiency below 100 percent, with the result that the powers to be transmitted should be kept as low as possible in order to reduce the losses.

Furthermore, such DC-DC converters must be designed for the expected peak power. This design considerably influences the weight, installation space and costs of the DC-DC converters. Furthermore, it influences the average efficiency. If the expected peak power is far above the average power, the average efficiency of the converter greatly decreases since DC-DC converters from the prior art generally have high losses in the partial load range. For this reason, the practice of supplying loads (for example an air-conditioning compressor) with high powers, which are furthermore also only occasionally operated, via DC-DC converters is extremely disadvantageous.

In order to also allow a high fluctuation of the load at a voltage level supplied via DC-DC converters, there is a need for either a large and loadable buffer, for example a low-impedance battery, or extremely fast regulation together with a high switching rate of the switches in the DC-DC converter, but this may have a disadvantageous effect on the efficiency. Both alternatives result in increased vehicle costs.

Furthermore, DC-DC converters are not necessarily bidirectional, that is to say they do not necessarily allow energy flow in both directions, but rather must be deliberately equipped with such a functionality if desired. This step restricts the choice of possible circuits or finished devices and generally causes additional costs.

In order to reduce the long charging times of electric vehicles in the case of conventional alternating current or three-phase current, the practice of directly charging the battery with regulated DC voltage or direct current has also been established in the prior art [Y. Du, S. Lukic, B. Jacobson, A. Huang (2011), Review of high power isolated bi-directional dc-dc converters for phev/ev dc charging infrastructure, IEEE ECCE, 553-560; M. Yilmaz, P. T. Krein (2013), Review of Battery Charger Topologies, Charging Power Levels, and Infrastructure for Plug-In Electric and Hybrid Vehicles, IEEE Transactions on Power Electronics, 28(5):2151-2169].

In vehicles from the prior art, the vehicle generally provides the charging system with direct access to the terminals of the high-voltage battery, with the result that the charging system can charge the high-voltage battery with very high currents in a current-controlled and/or voltage-controlled manner. On account of the virtually direct access to the battery, in which the electrical charging energy is not converted, the limits of typical converting power electronic charging circuits, for example DC-DC converters or regulated rectifiers, the semiconductors and magnetic components of which have strict current limits on account of heating, can be circumvented. Considerably faster charging with higher currents is therefore possible. At the same time, very heavy, voluminous and cost-intensive power electronic charging circuits can be avoided and the vehicle weight can therefore be reduced. Furthermore, charging regulation can be carried out in the DC voltage charging system.

However, DC-voltage charging up to a maximum of 400 V has been established in the prior art. Therefore, future vehicles with higher battery voltages can be charged either only partially or not at all using existing charging stations which provide a DC-voltage charging system. Such a vehicle which is incompatible with an existing charging infrastructure could be unsaleable for a manufacturer.

The use of DC-DC converters from the prior art which adapt the direct current or the DC voltage from the DC-voltage charging system to the vehicle's own battery voltage has numerous disadvantages. On account of the extremely high charging powers of currently more than 150 kilowatts (kW), such a DC-DC converter would be very large spatially and would be very heavy and cost-intensive on account of the magnetic components which currently cannot be integrated, such as coils and transformers. Since the DC-DC converter would have to be individually designed for the battery in the respective vehicle, it could highly likely be installed in the vehicle and thus further increase the extremely high weight of electric vehicles and limit the range. According to the prior art, the enormous powers required which would be converted according to the principle of switching conversion would result in considerable emission of electromagnetic interference which could be at least two orders of magnitude above interference currently known in DC-DC converters in the vehicle.

Since the DC-voltage charging system also assumes direct access to the high-voltage battery terminals, such an interposed DC-DC converter which adapts the voltage would have to carry out the charging regulation of the battery, on the one hand, but would have to simulate a battery with reduced voltage to the DC-voltage charging system, on the other hand. Such DC-DC converters require sophisticated regulation and are currently not established in the prior art.

The document US 2009/0079384 describes a system which, via a type of switching matrix, represents the battery modules either all in series or in parallel and resembles a Marx converter in this case. This solution disadvantageously requires, on the one hand, a very large number of switches and, on the other hand, the latter must be bidirectional. However, bidirectional switches can be implemented as semiconductor switches only with a high outlay. In particular, the switches must be designed for the maximum battery voltage and must be able to disconnect the latter.

The document US 2012/0007557 presents a system in which a battery is charged as a series circuit of battery elements, for example, but is discharged as a parallel circuit, by accordingly designing the connectors or other devices which are unchangeable during operation.

The document U.S. Pat. No. 4,818,928 describes a battery consisting of two battery elements, in which the two batteries can be connected either in series or in parallel by means of an electrical switch and can be presented to a load.

One possibility for operating and uniformly loading and charging a plurality of battery elements is described in the document US 2012/0091731. Said document describes a battery charging system which controls the arrangement of a plurality of batteries, which are arranged in a plurality of battery banks, between a series circuit during the driving of an electrical load and a parallel circuit during the charging operation.

The document US 2012/0200242 presents a system which makes it possible, by means of suitable switching, to dynamically set the polarity of the voltage for a load using two dedicated batteries by changing the battery. Nevertheless, it cannot generate voltages of absolute values, and in particular cannot generate any voltages, other than the two voltages of the batteries used.

The document US 2013/0127400 discloses parallel operation of two batteries in a vehicle, a main battery and an auxiliary battery, the auxiliary battery supplying one or more loads in the short term and the main battery being able to recharge the auxiliary battery via voltage converters, for example DC-DC converters. The two batteries cannot be combined and must resort to switching conversion in order to generate voltage levels other than those of the batteries. An electronic circuit which enables this operation is not provided.

A number of inventions in the literature describe circuits for exchanging charge between parts of a battery, generally different cells of the battery, in order to actively compensate for charge differences with lower losses. For example, the documents U.S. Pat. Nos. 5,710,504 and 6,064,178 and the publications by H.-S. Park, C.-E. Kim, C.-H. Kim, G.-W. Moon, J.-H. Lee [(2009), A modularized charge equalizer for an hey lithium-ion battery string, IEEE Transactions on Industrial Electronics, 56(5):1464-1476] and Einhorn et al. [M. Einhorn, W. Roessler, J. Fleig (2011), Improved performance of serially connected Li-ion batteries with active cell balancing in electric vehicles, IEEE Transactions on Vehicular Technology, 60(6):2448-2457.] each describe different systems which exchange charge between parts of a battery by using storage elements, for example capacitances or inductances.

However, none of these documents from the prior art provides a solution which generates at least one further voltage level from the battery in such a manner that a high electrical power can be removed or supplied.

One object of the invention is to provide a system which makes it possible to control a plurality of voltage levels of the same and/or lower voltage from a high-voltage energy store.

SUMMARY

Within the scope of the present invention, the term "battery system" is understood as meaning an electrical circuit which has at least one battery and regulation and/or control of the circuit.

The term "battery" is understood as meaning any form of electrical energy stores, electrical energy sources, rechargeable batteries, galvanic cells or galvanic elements and interconnections (serial and/or parallel), couplings and/or combinations thereof.

The term "battery element" is understood as meaning identical or heterogeneous subunits, cells or battery parts which are interconnected via a suitable circuit to form a battery. Pairs of battery taps, between which a voltage is provided, are likewise understood as meaning a battery element.

The invention provides a battery system that allows a plurality of voltage levels to be provided for a corresponding plurality of load consumers with at least one battery. For this purpose, the at least one battery has a plurality of battery elements. A regulating or control unit and a switching unit with at least one switching element are also provided. The regulating or control unit is configured to instruct the switching unit to dynamically switch the at least one switching element over time such that battery elements from at least one accordingly dynamically changing subset of the plurality of battery elements are connected, and a respective voltage level to be provided is provided thereby for the plurality of load consumers.

In this case, a subset is a group consisting of one or more battery elements. According to the invention, the battery elements in a subset are connected to one another with a corresponding switching position of the at least one switching element. It is conceivable to provide a plurality of subsets each with battery elements defined therein, which can be connected to one another with a corresponding switching position of the at least one switching element, and in turn to connect these subsets to one another or to avoid connecting individual battery elements or subsets to other battery elements or subsets. In this case, the subsets may be identical, may overlap or may be completely different from one another.

In one embodiment of the battery system, the respective battery elements are deliberately loaded by achieving at least one predefined regulating goal.

According to the invention, a different voltage level can be provided for each of the plurality of load consumers, for which voltage level the respective load consumer is designed and configured.

In one embodiment of the battery system according to the invention, the battery and/or battery element has/have at least one additional battery tap which is arranged between a positive pole and a negative pole of the battery and/or battery element and can be combined with other additional battery taps and can be used to provide a partial voltage which is different from the total voltage of the battery and/or battery element which can be provided between the positive pole and the negative pole, the positive pole and the negative pole themselves respectively forming a battery tap.

In another embodiment of the battery system according to the invention, the regulating or control unit is configured to instruct the switching unit to switch the switching elements and to thereby switch back and forth between the battery taps in such a manner that the plurality of battery elements are deliberately loaded.

In yet another embodiment of the battery system according to the invention, the battery has at least one additional pair of output terminals for a pair of output terminals between the positive pole and the negative pole, which additional pair of output terminals provides a voltage which is at least occasionally different from the total voltage of the battery which can be provided between the positive pole and the negative pole.

The battery taps and output terminals are designed to connect electrical sources, electrical sinks, electrical stores or electrical lines.

In another embodiment of the battery system, at least one pair of output terminals has at least one switching element that alternately electrically connects the at least one pair of output terminals to at least two different combinations of the battery taps or disconnects said pair according to its switching direction.

In yet another embodiment of the battery system according to the invention, at least two different pairs of output terminals can be connected to an associated non-identical set of pairs of battery taps via the at least one switching element.

In another embodiment, the battery system is configured to provide at least one pair of output terminals with a plurality of voltage levels, between which it is occasionally possible to change.

In two different embodiments of the battery system according to the invention, the at least two non-identical pairs of battery taps have approximately the same electrical voltage or do not have the same electrical voltage.

In one embodiment of the battery system, the at least one switching element is a semiconductor switching element or a rectifying or rectifier element.

In another embodiment of the battery system according to the invention, the voltage provided by the at least one additional pair of output terminals is smaller than the voltage provided between the positive pole and the negative pole.

In yet another embodiment of the battery system according to the invention, the voltage provided by each pair of output terminals has the same polarity.

In another embodiment of the battery system according to the invention, the battery taps subdivide the battery in such a manner that each part of the battery is surrounded by different pairs of battery taps equally often.

In another embodiment of the battery system according to the invention, the battery control regulates or controls a residence time of the switching elements in a position for connecting the at least one pair of output terminals to the battery taps.

In further embodiments, the battery control is configured to instruct the switching unit to change over between combinations of battery taps at a changeover rate of less than 100 hertz (Hz) or at a changeover rate of less than 1 Hz.

In another embodiment of the battery system according to the invention, an electrical filter generates a uniform voltage at least at one pair of output terminals.

In yet another embodiment of the invention, the battery system detects the voltage expected and/or required at the at least one pair of output terminals and the battery control instructs the switching unit to accordingly set the switches such that the expected and/or required voltage is present at the at least one pair of output terminals.

In another embodiment of the battery system according to the invention, the paired connection between the at least one pair of output terminals and the different pairs of battery taps alternately exists via the at least one switching element, that is to say the pairs of output terminals are alternately connected to different pairs of battery taps.

In yet another embodiment of the battery system, both an electrical potential of the battery taps and an electrical potential of the output terminals are dynamically stabilized among one another and/or with respect to one another.

In another embodiment, the at least one pair of output terminals has a CLC filter with at least one inductance and at least two capacitances, the at least two capacitances each being connected to an electrical connection of the inductance.

In another embodiment, the at least one pair of output terminals has an LCL filter with at least two inductances and at least one capacitance, the at least two inductances each being connected to an electrical connection of the capacitance.

In another embodiment of the battery system, at least one pair of output terminals and/or at least one battery tap has/have at least one voltage sensor and/or at least one current sensor, the signals from which are transmitted to the battery control.

In another embodiment of the battery system, the at least one current sensor is designed to detect an inflowing and outflowing charge from at least one center tap.

In yet another embodiment of the battery system according to the invention, at least one circuit loop which can establish an electrically conductive connection between two non-identical battery taps has at least one electrical fuse and/or an electrical contactor which is/are configured to interrupt the electrically conductive connection.

In another embodiment, at least one battery tap and/or at least one pair of output terminals has/have at least one electrical fuse and/or at least one electrical contactor which is/are configured to interrupt the electrical line from the battery.

In another embodiment of the battery system according to the invention, at least one battery tap and/or at least one pair of output terminals has/have at least one inductive element and/or at least one capacitive element.

In yet another embodiment of the battery system according to the invention, at least one battery tap has at least one inductive element which is placed in such a manner that each current path runs through one of the inductive elements when at least one pair of output terminals is alternately connected in pairs to all pairs of battery taps.

In another embodiment of the battery system according to the invention, the battery system has a measuring multiplexer.

In yet another embodiment of the battery system according to the invention, the battery elements have different physical and/or chemical properties. For example, the cell chemistry, internal resistance, electrochemical reaction speed, energy density, power density, energy content, heating behavior, charging or discharging cut-off voltage, ageing behavior or properties derived therefrom may be different.

The invention also comprises a battery control for controlling a connection between at least one pair of output terminals and at least one pair of battery taps. The battery control has a regulating or control unit and approximates the voltage to be provided by the at least one pair of output terminals by means of a weighted linear combination of the voltages from the pairs of battery taps, between which the battery control dynamically changes over time, and regulates or controls a temporal residence time of the switching elements in a position for connecting the output terminals to the battery taps.

In one embodiment of the battery control according to the invention, the latter uses, as the weighting factor, a portion of the temporal residence time of the respective switching combination of the total time.

In another embodiment of the battery control, the latter optimizes a further regulating goal or a secondary condition, for example uniform discharging or charging of the battery or battery elements, deliberately unequal discharging or charging of the battery or battery elements, uniform or deliberately non-uniform ageing, uniform or deliberately non-uniform heating or temperature distribution, an identical or deliberately unequal voltage or an identical or deliberately unequal state of charge, if an under-determined linear combination is present.

Further advantages and configurations of the invention emerge from the description and the accompanying drawings.

It goes without saying that the features mentioned above and the features yet to be explained below can be used not only in the respectively stated combination but also in other combinations or alone without departing from the scope of the present invention.

DETAILED DESCRIPTION

Figure 1:
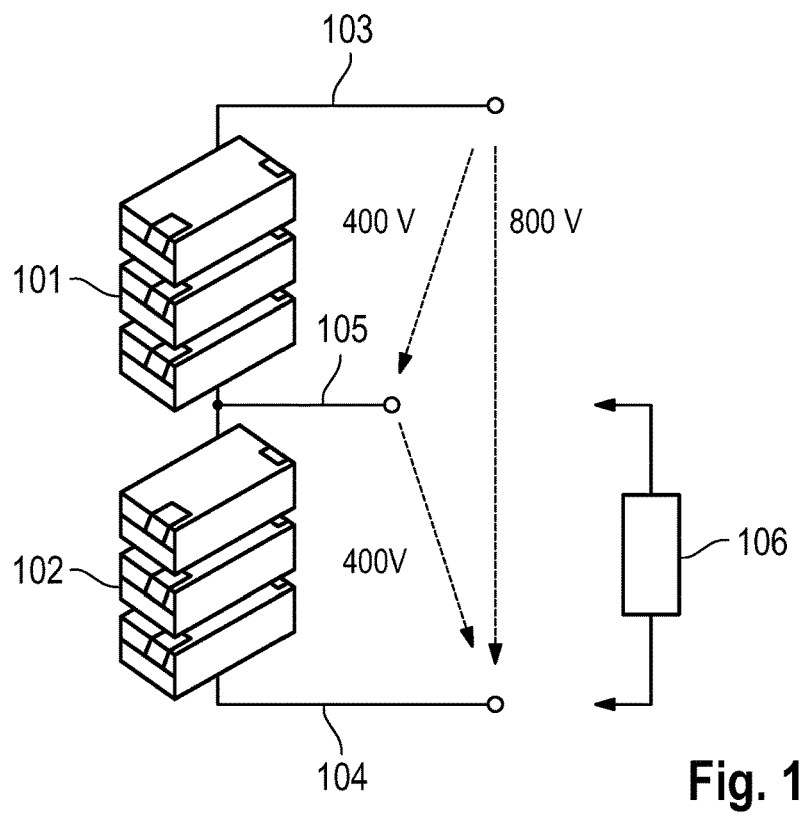
FIG. 1 shows a battery from the prior art which, in addition to a positive pole and a negative pole, also has a center tap.

A battery according to the prior art is illustrated with reference to FIG. 1. The battery has a first battery element 101 and a second battery element 102. The battery additionally has a positive pole 103 and a negative pole 104. The battery also has an additional battery tap 105. The additional battery tap 105, here a so-called center tap, is arranged between the first battery element 101 and the second battery element 102. With the additional battery tap 105, the battery is suitable for providing a plurality of voltages. A load 106 is connected to the battery. However, the connected load 106 loads the battery in a non-uniform manner, that is to say the battery would be charged or discharged in a non-uniform manner.

Figure 2:
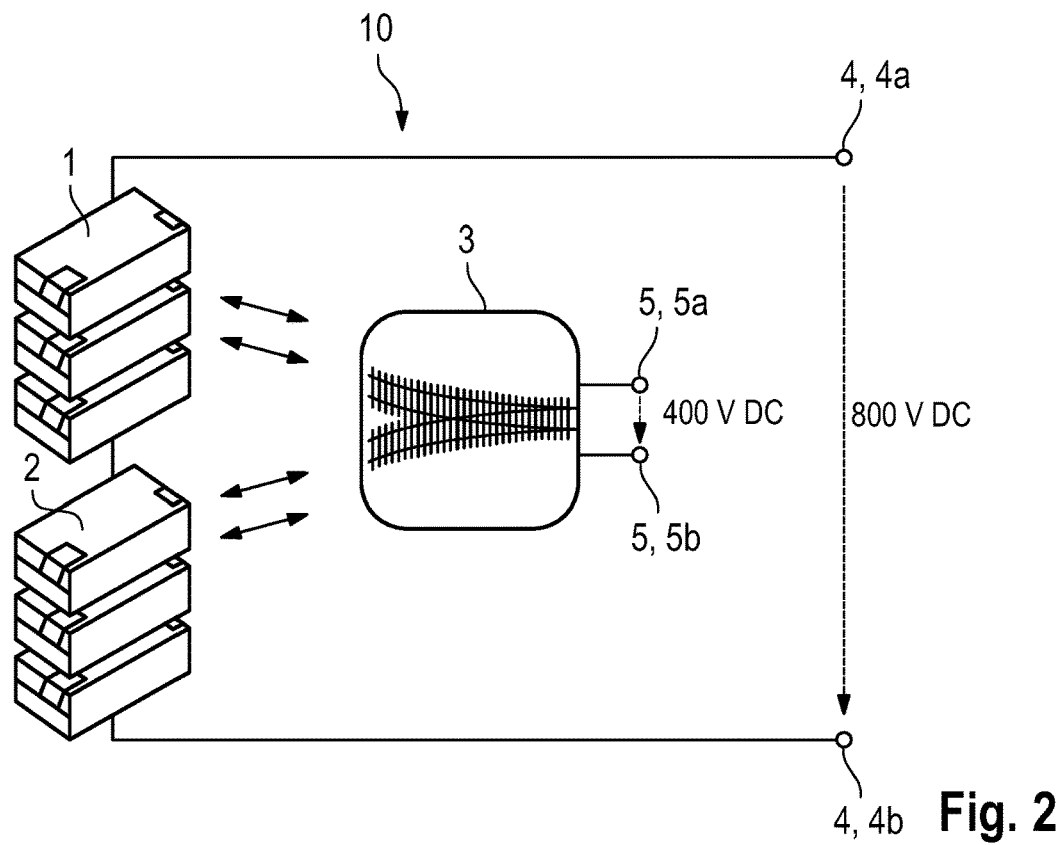
FIG. 2 illustrates the principle of the battery system according to the invention.

The principle of the present invention shall be explained with reference to FIG. 2. FIG. 2 shows a battery system 10 according to the invention having a battery 9 that has a first battery element 1 and a second battery element 2, between which a voltage can be provided at a pair of output terminals 4. The battery 9 has a positive pole 8+ and a negative pole 8−. The pair of output terminals 4 is formed from the output terminals 4a and 4b. The battery system 10 shown also has a switching unit 3. The switching unit 3 is configured to dynamically alternately switch back and forth between the first battery element 1 and the second battery element 2 and to connect the battery elements 1, 2 to a pair of additional output terminals 5. It is conceivable, as also explained subsequently, that the battery system 10 according to the invention has more than one additional pair of output terminals 5 consisting of output terminals 5a and 5b. The at least one additional pair of output terminals 5 forms its own voltage level. The electrical voltage which can be provided by the at least one additional pair of output terminals 5 can at least occasionally differ from the electrical voltage which can be provided by the pair of output terminals 4 between the positive pole 8+ and the negative pole 8−. Electrical loads or load consumers can be connected to the pairs of output terminals 4, 5. The loads which can be connected may also directly be a high-voltage and/or low-voltage electrical system of a vehicle, a buffer battery or the like. A buffer battery has an operating voltage which corresponds to the temporal average of the electrical voltage between the additional pair of output terminals 5. The switching unit 3 is configured to dynamically alternately connect the first battery element 1 or the second battery element 2 to the additional pair of output terminals 5 in an electrically conductive manner. For this purpose, the switching unit 3 has at least one switching element 6, as shown in FIG. 3.

Figure 3:
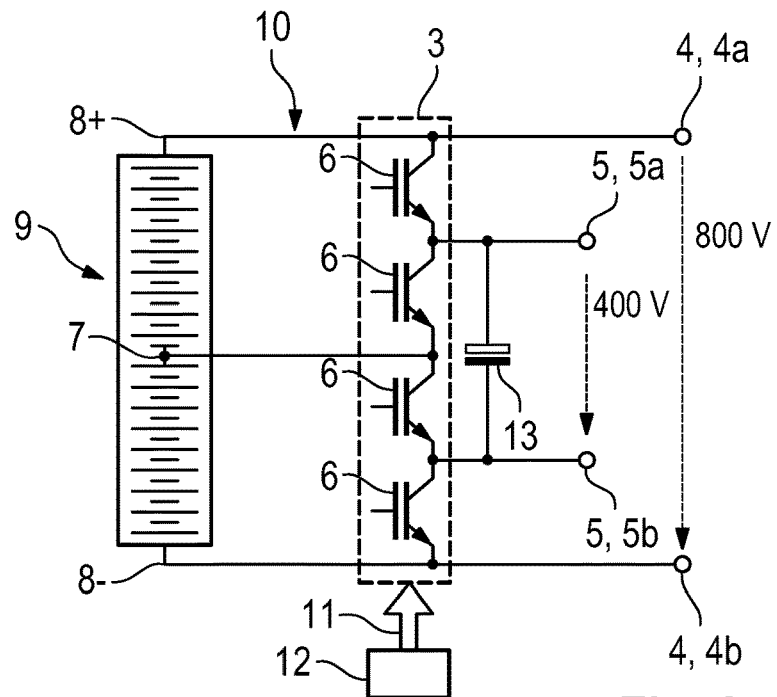
FIG. 3 shows an exemplary embodiment of the battery system according to the invention having an additional pair of output terminals.

In the battery system 10 shown in FIG. 3, the switching unit 3 has four switching elements 6 which are each a semiconductor element, here an insulated gate bipolar transistor (IGBT). However, it is conceivable that another semiconductor element, such as a field effect transistor, a bipolar transistor, a thyristor, a triac or a similar electronic switch, can also be used. Relays are likewise conceivable. In addition, one of two switching elements 6 may furthermore also respectively be a rectifying switch, for example a diode, a Schottky rectifier or another rectifier element.

Within the scope of this disclosure, the term "electrical switches" or "switching elements" is also understood as meaning electronic switching elements.

The battery 9 additionally has an additional battery tap in the form of a center tap 7. The at least one additional pair of output terminals 5 can be dynamically alternately connected to at least two different combinations of electrical battery taps 7, 8+, 8− in an electrically conductive manner via the electrical switches 6 in the switching unit 3. This means that at least one of the two output terminals 4a, 4b, 5a, 5b of each of said at least one pair of electrical output terminals 4, 5 can be electrically disconnected from an electrical battery tap 7, 8+, 8− and can be connected to another electrical battery tap 7, 8+, 8− in an electrically conductive manner via the at least one electrical switch 6. It is conceivable that both terminals 4a, 4b, 5a, 5b of each of said pairs of output terminals 4, 5 can be electrically disconnected from a (paired) combination of battery taps 7, 8+, 8− and can be connected to another combination of battery contacts 7, 8+, 8− in an electrically conductive manner. In this case, each combination of battery taps per se forms a subset in the sense of the invention. It is also conceivable that each terminal 4a, 4b, 5a, 5b has two electrical switches 6, that is to say four electrical switches 6 for each pair of output terminals 4, 5.

With the at least two pairs of output terminals 4, 5 and the at least three battery taps 7, 8+, 8−, the battery system 10 is configured in such a manner that none of the output terminals 4a, 4b, 5a, 5b is directly electrically connected to one of the battery taps 7, 8+, 8−. The pair of output terminals 5 has an optional capacitor as a capacitance 13 here.

If the battery 9 contains charge, the voltage provided at each pair of output terminals 4, 5 is smaller than the voltage between the positive pole 8+ and the negative pole 8− of the battery 9, in which case the voltages provided have the same polarity.

As a result of the arrangement of the electrical battery taps 7, 8+, 8− on the battery 9, the battery 9 can be subdivided in such a manner that each part of the battery 9 is surrounded by different ones of these pairs of battery taps 7, 8+, 8− equally often. A control signal 11 from a regulating or control unit 12 can be used to set the switches 6 in such a manner that pairs of electrical battery taps 7, 8+, 8− are electrically connected to particular pairs of output terminals 4, 5.

According to the invention, the regulating or control unit 12 instructs the switching unit 3 to switch a pair of output terminals 4, 5 back and forth between at least two non-identical pairs of battery taps 7, 8+, 8− with an approximately identical electrical voltage by means of electrical switches 6.

In the simplest case, for example, the battery 9 for the battery system 10, which is intended to have only 1/nth of the battery voltage as the output voltage, is conceptually divided into n identical parts and an electrical battery tap 7 is produced at each boundary between two parts, two adjacent battery taps 7 respectively forming a pair of battery taps 7, 8+, 8− and each battery tap, apart from the marginal battery taps 8+, 8−, being included in two pairs of battery taps. According to the invention, each part of the battery 9 may form a subset, with the result that n subsets are produced. Alternatively, a plurality of connected parts of the battery 9 form a subset. Alternatively, the battery 9 may also be conceptually divided, for example, into 2n parts of the same size with corresponding battery taps 7 at the boundaries, in which case one pair respectively comprises every second battery tap 7 and consequently one battery tap 7 forms a pair with the neighbor of its immediate neighbor. If a pair of battery taps 7 comprises a plurality of parts of the battery 9 or a plurality of battery elements, this plurality of parts or battery elements forms a subset. In all of these cases, any desired part of the battery 9 may also be uniformly loaded by an individual pair of output terminals 4, 5 by suitably selecting a temporal residence time in particular electrical connection combinations with the pairs of battery taps 7, 8+, 8− or may satisfy other conditions.

Specifically projected onto this simplest case, a second voltage of 400 V is generated, for example, from the battery 9 that can provide a voltage of 800 V and consists of an even number of battery elements 1, 2, by virtue of the battery 9 having a center tap 7 arranged between the two battery elements 1, 2. The battery 9 consequently has at least three battery taps 7, 8+, 8−, a positive battery tap 8+ at the electrically most positive point of the battery 9, a negative battery tap 8− at the electrically most negative point of the battery and the center tap 7 with approximately half the voltage of the battery 9. Whereas all 800 V systems continue to be supplied from the negative and positive battery taps 8−, 8+ using the pair of output terminals 4, the combination of the center tap 7 and the negative battery tap 8− and the combination of the positive battery tap 8+ and the center tap 7 respectively provide approximately half the voltage. Whereas 400 V loads could now be operated, in principle, from each of the two combinations, such a procedure would result in the two parts of the battery 9 being loaded in a non-uniform manner. Furthermore, equalization by hard-wired distribution of a plurality of loads among the two combinations, for example already during production, is not advisable since this reduces, but cannot preclude, the risk of non-uniform loading. According to the invention, the 400 V load can instead be switched back and forth between the two alternative combinations of battery taps 7, 8+, 8− of the battery 9 shown in FIG. 3 by using electrical switches 6. The load can be distributed uniformly among the two alternative combinations, for example on the basis of the charge which has already flowed, by suitably selecting the average period for which each combination is switched. In addition to uniform discharging/charging, deliberately unequal discharging/charging, uniform or deliberately non-uniform ageing, uniform or deliberately non-uniform heating or temperature distribution, an identical or deliberately unequal voltage or an identical or deliberately unequal state of charge can furthermore also be used as the regulating or control goal by the regulating or control unit 12. A plurality of these regulating or control goals can also be used at the same time with a sufficiently large number of alternative pairs of battery taps 7, 8+, 8− between which a particular pair of output terminals 4, 5 can be switched back and forth.

If the electrical voltage from the non-identical pairs of battery taps 7, 8+, 8− is different, the changeover between the various combinations of pairs of battery taps 7, 8+, 8− is used to generate a voltage for the voltage level of one pair of output terminals 4, 5 on temporal average by means of a suitable residence time of the circuit in the individual combinations. For this purpose, the battery 9 may have a plurality of combinations of pairs of battery taps 7, 8+, 8−, with the result that generation of a predefined voltage of the corresponding voltage level at least occasionally enables more than one solution by means of a suitable residence time of the circuit in the individual combinations and is therefore under-determined. The under-determined nature is removed or reduced by consulting at least one further regulating goal or at least one further boundary condition. Regulating goals or boundary conditions may be uniform discharging or charging, uniform ageing, uniform degradation, a uniform state of charge or a uniform temperature. One example would be a battery 9 consisting of four battery elements (for example, the battery elements 1 and 2 could each be subdivided into two halves and could have an additional battery tap (center tap) 7) that makes it possible to provide voltage, for example a quarter or a half of the total battery voltage, using a plurality of combinations of pairs of battery taps 7, 8+, 8−.

The operation of switching back and forth between the pairs of battery taps 7, 8+, 8− is preferably carried out at such a low frequency that the additional energy losses in the form of heat produced directly on account of the operation of switching back and forth are less than 10 percent of the energy losses in the form of heat which would be produced without an operation of switching back and forth in the battery system.

The operation of switching back and forth between the pairs of battery taps 7, 8+, 8− is preferably carried out at a frequency of less than 100 hertz. A frequency of less than 1 hertz is particularly preferred.

Figure 4:
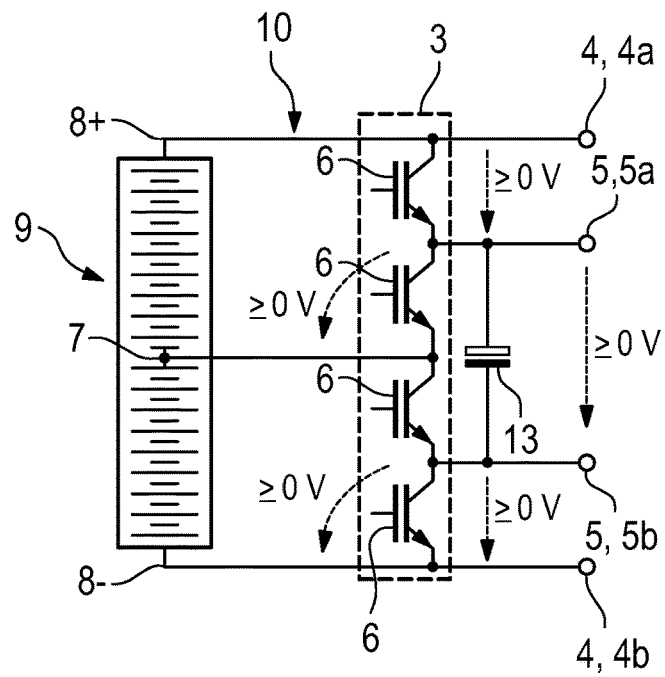
FIG. 4 illustrates typical voltage conditions in an embodiment of the battery system according to the invention.

FIG. 4 illustrates the voltage conditions which are satisfied during operation of the battery system 10. FIG. 4 substantially reconstructs the circuit from FIG. 3. A positive voltage is respectively present between the output terminals 4a and 5a, 5a and 5b, 5b and 4b. A positive voltage is likewise present across the transistor 6 to the center tap 7 and across the transistor 6 to the negative pole 8− of the circuit. Accordingly, the voltage provided by each pair of output terminals 4, 5 has the same polarity.

Figure 5:
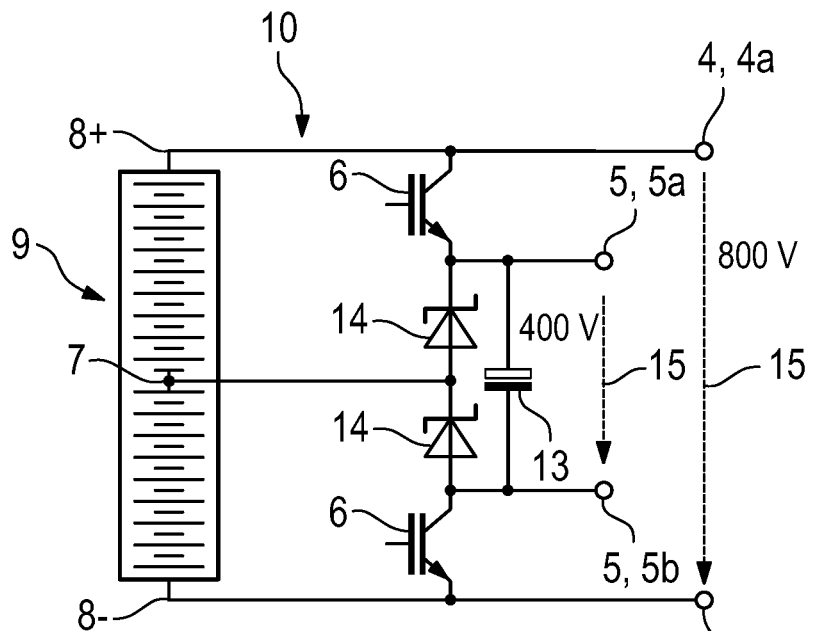
FIGS. 5 and 6 each show an embodiment of the battery system according to the invention in which one part of the at least one switch is respectively in the form of a rectifier element.
Figure 6:
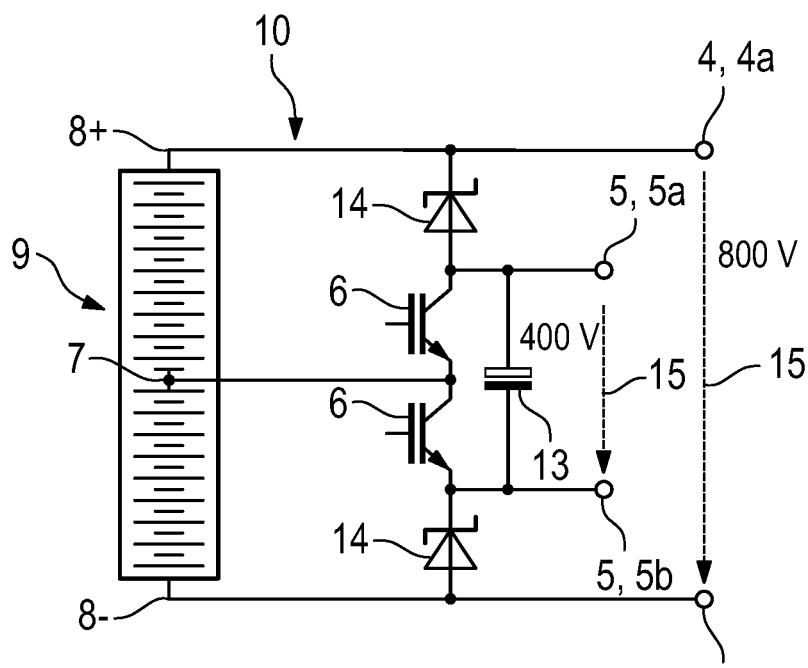

FIGS. 5 and 6 each show an embodiment of the battery system 10 according to the invention. However, the switching unit 3 does not have four IGBTs 6, but rather only two in each case. Two of the IGBTs 6 have each been replaced with rectifier elements 14, for example diodes or Schottky diodes. An optional capacitance 13 is likewise implemented in the circuit.

Figure 7:
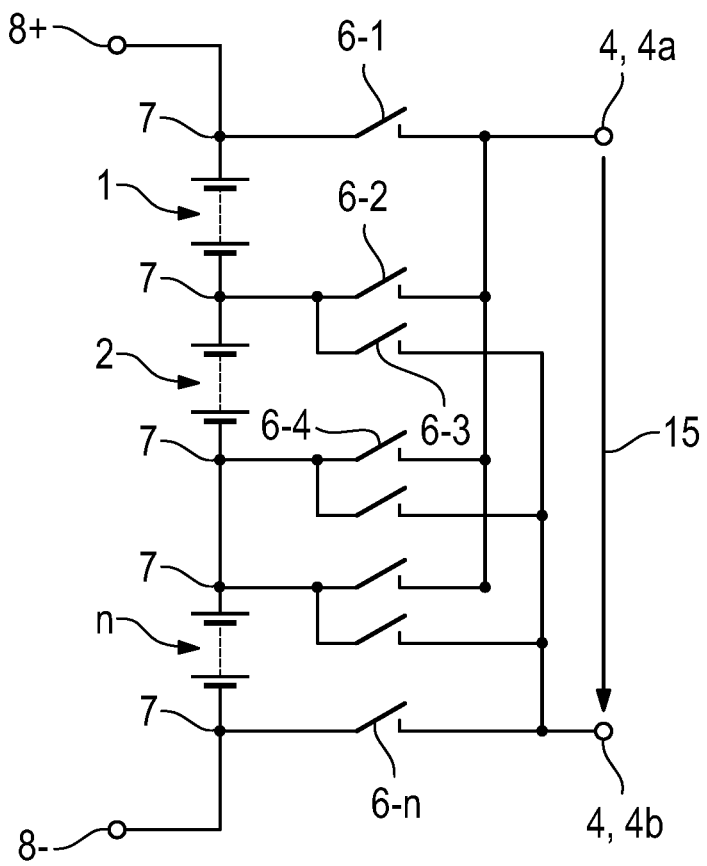
FIG. 7 shows a sketch of an embodiment of the battery system according to the invention having n battery elements, battery taps and electrical switches.

FIG. 7 shows an exemplary circuit of the battery system 10 according to the invention for an unlimited number n of battery elements 1, 2, . . . , n. In this embodiment, the battery 9 has a multiplicity of additional battery taps 7 and a multiplicity of electrical switching elements 6-1, 6-2, . . . , 6-n. The electrical switching elements 6-1, 6-2, . . . , 6-n connect at least one pair of output terminals 4a, 4b to one pair of battery taps 7 in each case. The electrical voltage 15 corresponds to the voltage of the battery elements 1, 2, . . . , n which may each be individual battery cells or else larger units. The maximum voltage of the battery 9 is available between the positive pole 8+ and the negative pole 8−.

Figure 8A:
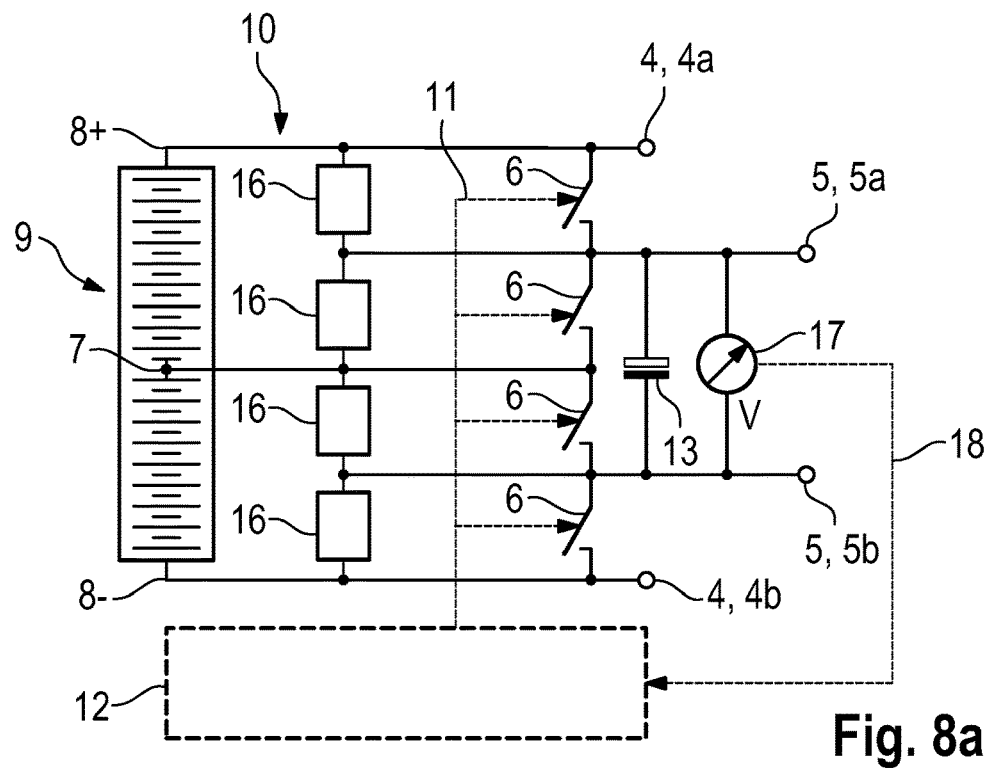
FIG. 8 shows an embodiment of the battery system where the electrical potentials of both the battery taps and the output terminals are dynamically stabilized among one another and with respect to one another.
Figure 9A:
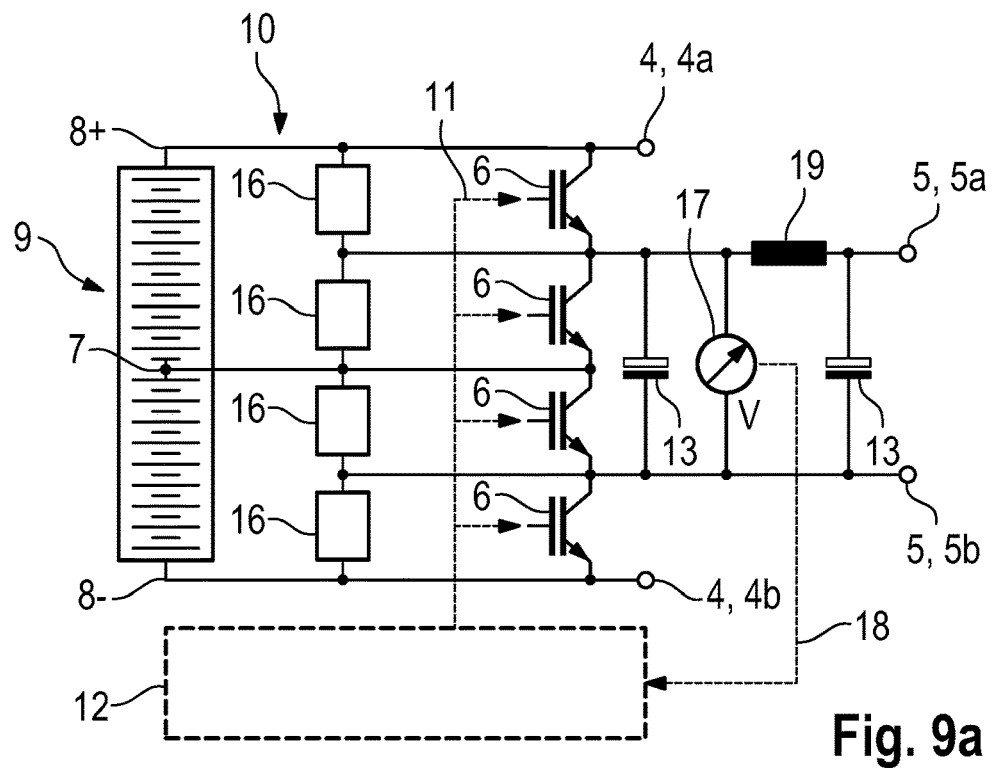
FIG. 9 shows an embodiment of the battery system according to the invention which has a CLC filter at least at one pair of output terminals.

FIGS. 8a and 9a each show an embodiment of the battery system 10 according to the invention in which electrical potentials of both the battery taps 7, 8+, 8− and the output terminals 5a, 5b are dynamically stabilized among one another and with respect to one another. For this purpose, use is made of at least one stabilizer 16 which is respectively electrically connected, by its at least two connections, to one battery tap 7, 8+, 8− and/or one output terminal 5a, 5b and is arranged in parallel with the respective switching element 6. In this manner, the battery taps 7, 8+, 8− and/or the output terminals 5a, 5b are stabilized with respect to one another via the stabilizers 16 which have a very small spacing or a minimal spacing with respect to their electrical potential. The stabilizers 16 also prevent the quick current path change in desired or unwanted inductances 19 (FIG. 9a) of the circuit, which is associated with a changeover, from resulting in inductive voltage spikes which result, for example, in undesirable interference of the voltages at the output terminals 4a, 4b, 5a, 5b and battery taps 7, 8+, 8− and/or high voltage loading of components and insulation. The regulating or control unit 12 transmits control signals 11 to the electrical switching elements 6 and receives sensor signals 18 from a voltage measuring device 17 which is arranged between the output terminals 5a and 5b.

In FIG. 9a, the electrical or electronic switching elements 6 are in the form of transistors. Furthermore, at least one pair of output terminals 5 has a so-called CLC (capacitor-inductor-capacitor) filter which has at least one inductance 19 and at least two capacitances 13 each connected to an electrical connection of said inductance 19. One or more capacitances in a stabilizing network can prevent a current, which is not extinguished despite a previously opened switch on account of current-driving inductive phenomena for example, from resulting only in a slow increase in voltage. In addition, an electrical resistor may also be connected in series with the capacitance 13. The filter could also be, for example, an LCL (inductor-capacitor-inductor) filter with two inductances 19 and one capacitance 13.

Figure 8B:
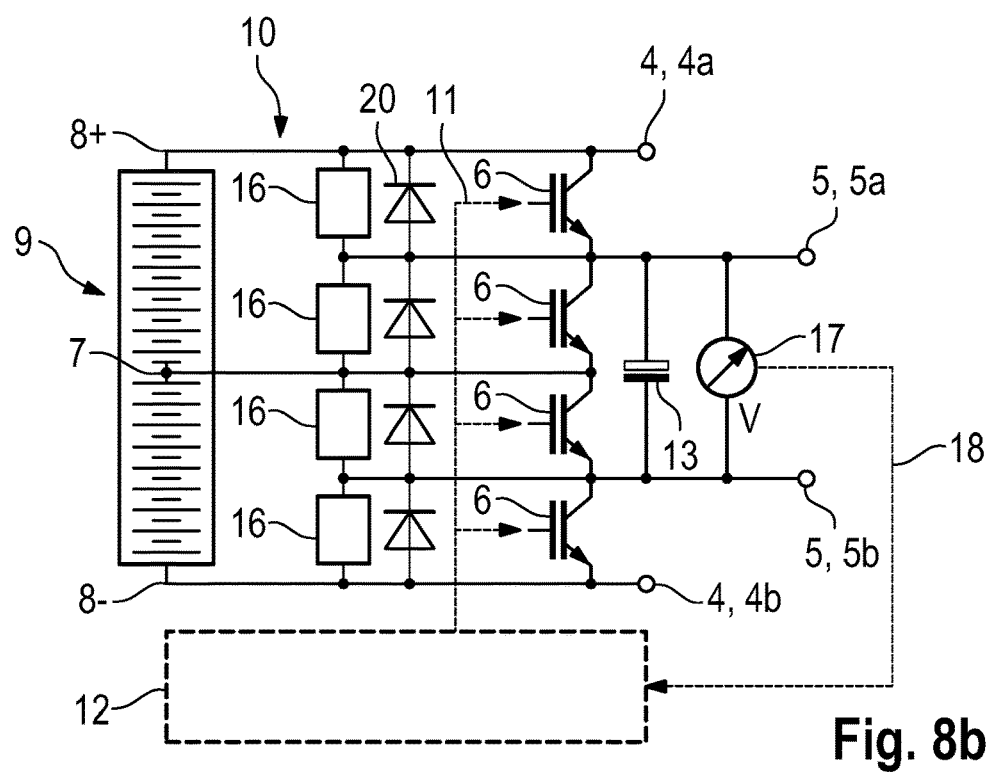
Figure 9B:
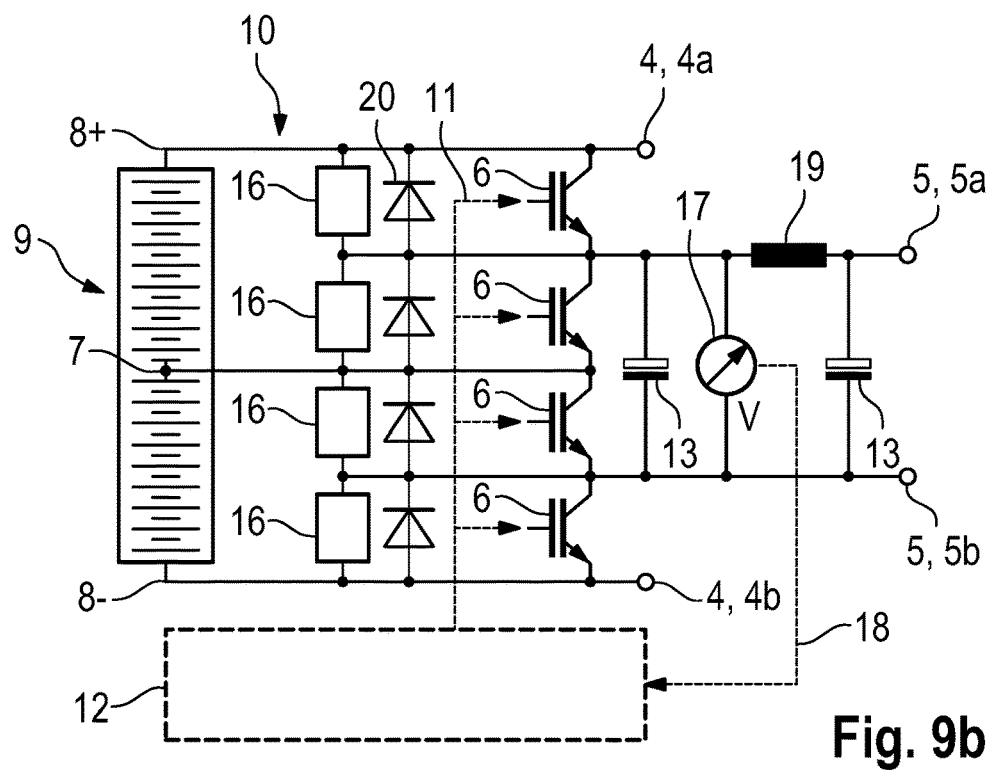

FIGS. 8b and 9b substantially show the battery system 10 from FIGS. 8a and 9a, but diodes 20 belong to the stabilizer network 16. In FIG. 8b, the electrical switching elements 6 have been replaced with transistors. A dynamic stabilizing network according to the invention may be able to discharge overvoltages, for example. This can be carried out by using at least one switching element 20, the electrical conductivity of which increases greatly in the short term in the event of voltage pulses with a certain minimum voltage, for example also surge diodes, transient voltage suppressors or Zener diodes.

Figure 10A:
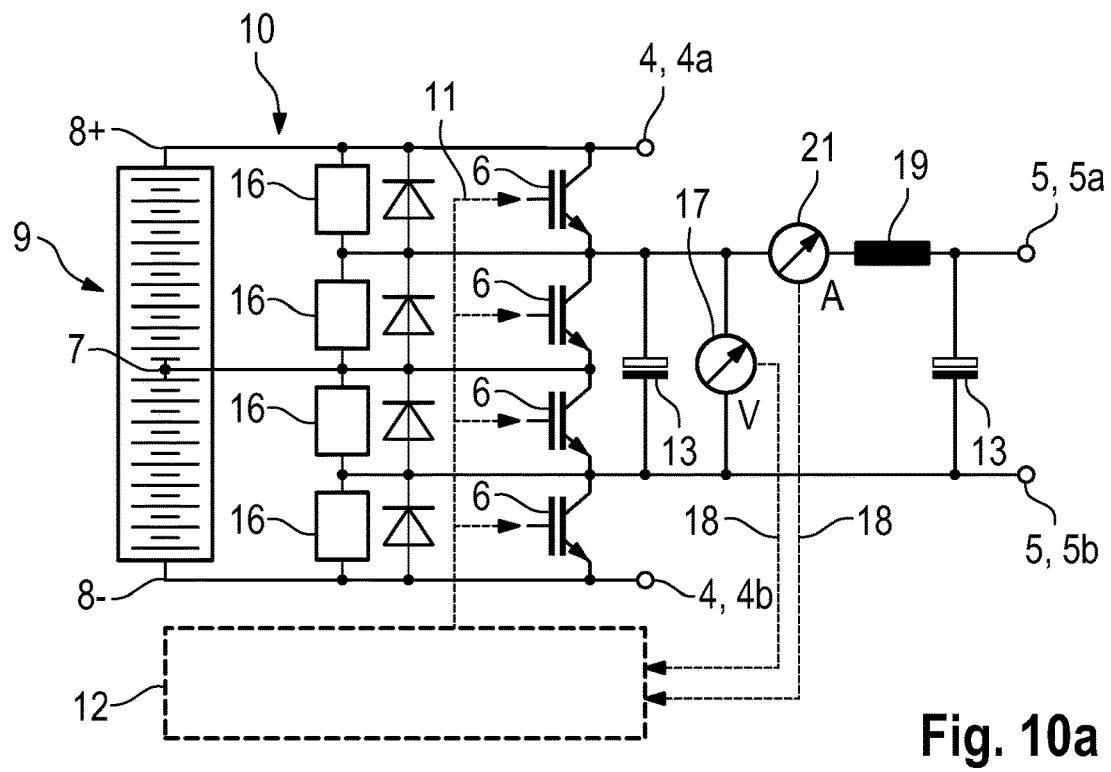
FIG. 10a and FIG. 10b each show an embodiment of the battery system having at least one current sensor and at least one voltage sensor.
Figure 10B:
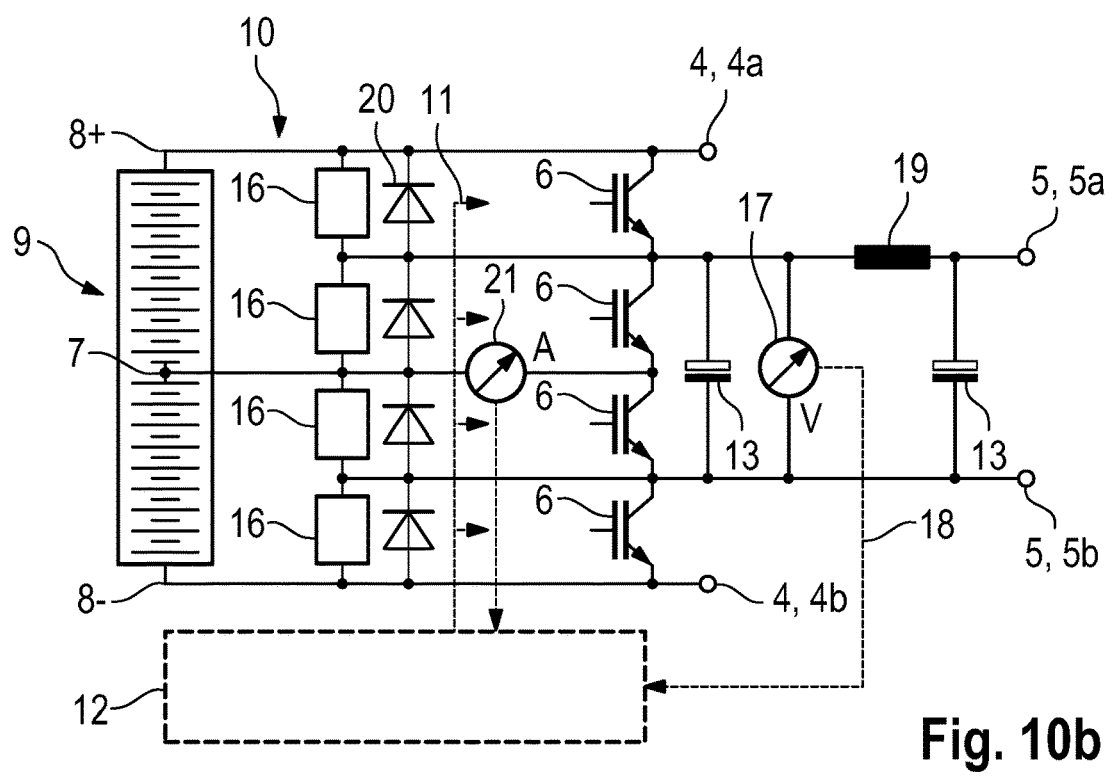

FIGS. 10a and 10b show further embodiments of the battery system 10 according to the invention and substantially extend the figures shown in FIGS. 8a to 9b with a current sensor 21. In FIG. 10a, which extends or supplements FIG. 9b, the current sensor 21 is arranged at the output terminal 5a upstream of the inductance 19. The sensor signals 18 from the current sensor 21 are transmitted to the regulating or control unit 12. In FIG. 10b, the current sensor 21 is arranged at the center tap 7 and detects the inflowing and outflowing charge. Current sensors 21 may, in principle, be installed in any embodiment of the battery system 10 according to the invention. In order to equalize the current load of each battery element 1, 2, a zero position of the current sensors 21 can be used and can be used as a goal by the regulation.

FIGS. 11 to 14 show embodiments of the battery system 10 according to the invention which has electrical fuses 22 and electrical contactors 23.

Figure 11:
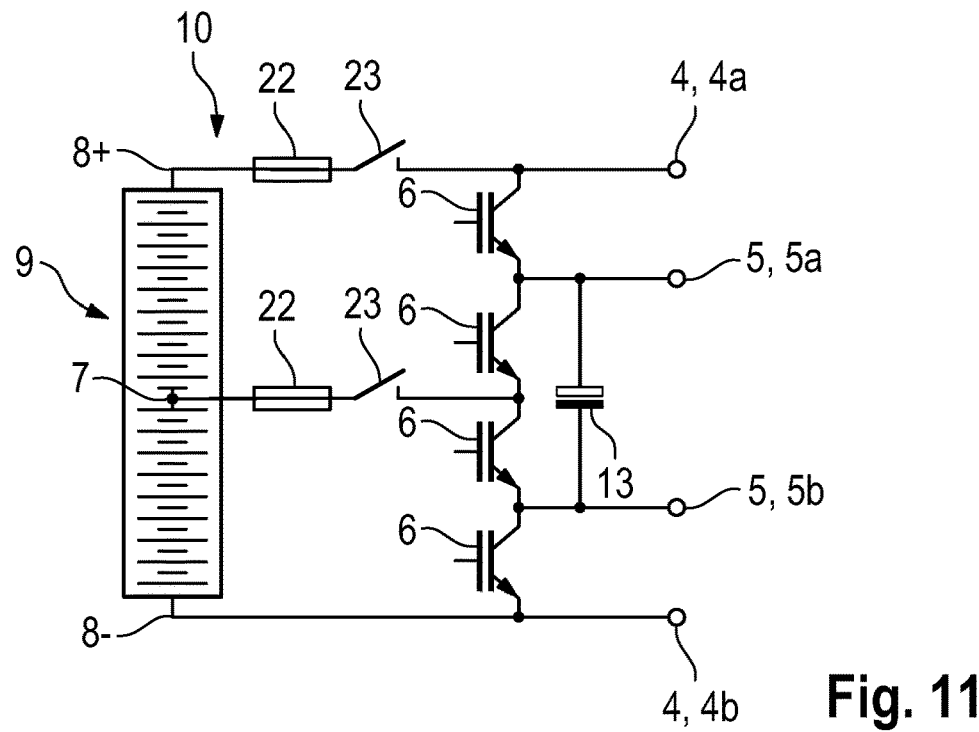
FIGS. 11 to 14 each show an embodiment of the battery system according to the invention having at least one electrical fuse and/or at least one electrical contactor.

The circuit in FIG. 11 has two electrical fuses 22 and two electrical contactors 23. In the circuit shown, the electrical circuit loop which has the electrical fuses 22 and electrical contactors 23 can establish an electrically conductive connection, in particular a so-called short circuit, between two non-identical battery taps 7, 8+, 8− by activating or damaging, for example by breaking down, particular electrical switches 6. The electrical fuses 22 and electrical contactors 23 are configured to interrupt the electrically conductive connection.

Figure 12:
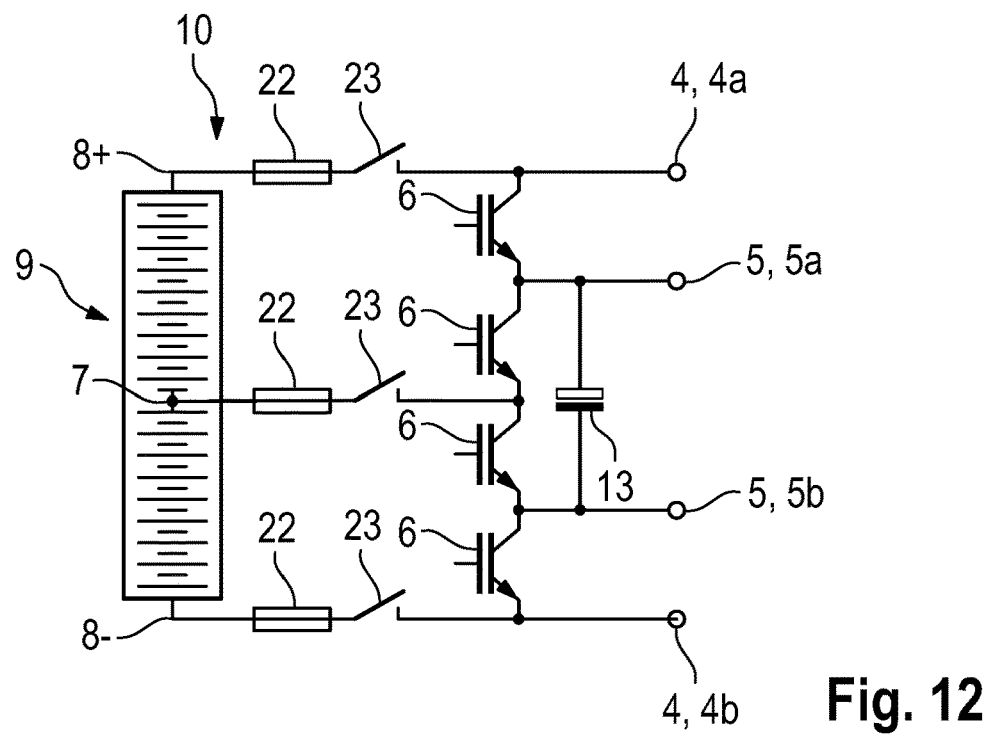

The circuit shown in FIG. 12 has an electrical fuse 22 and an electrical contactor 23 at each battery tap 7, 8+, 8−. The electrical fuses 22 and electrical contactors 23 can electrically disconnect the semiconductor switches 6 connected to a battery tap 7, 8+, 8− from the battery 9.

Figure 13:
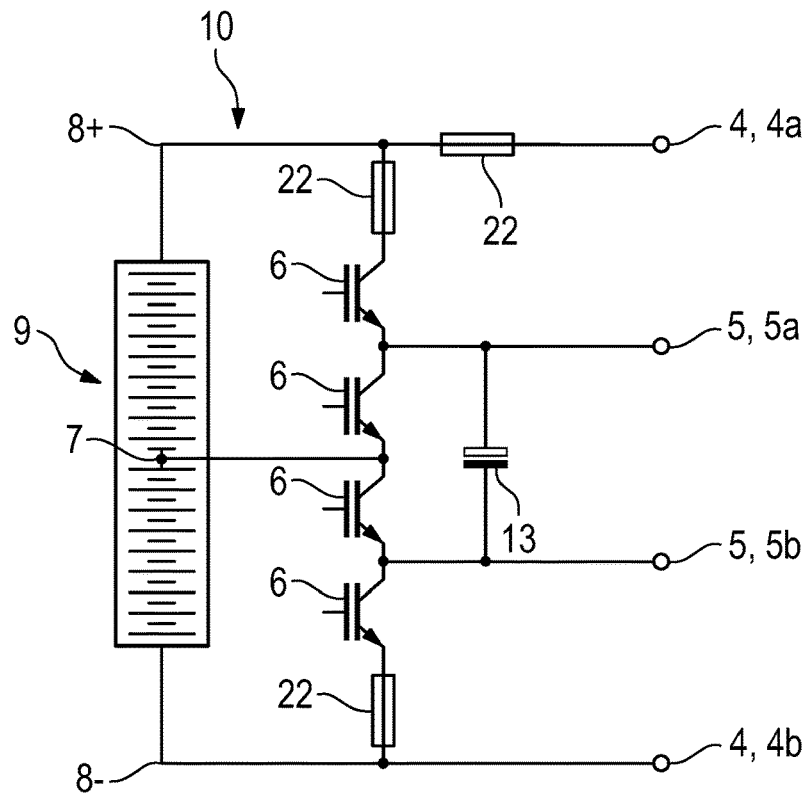

The circuit shown in FIG. 13 shows a circuit of the battery system 10 according to the invention in which electrically conductive connections, in particular also short circuits, between two different battery taps 7, 8+, 8− can be disconnected using a minimum of electrical fuses 22 and/or electrical contactors 23.

Figure 14:
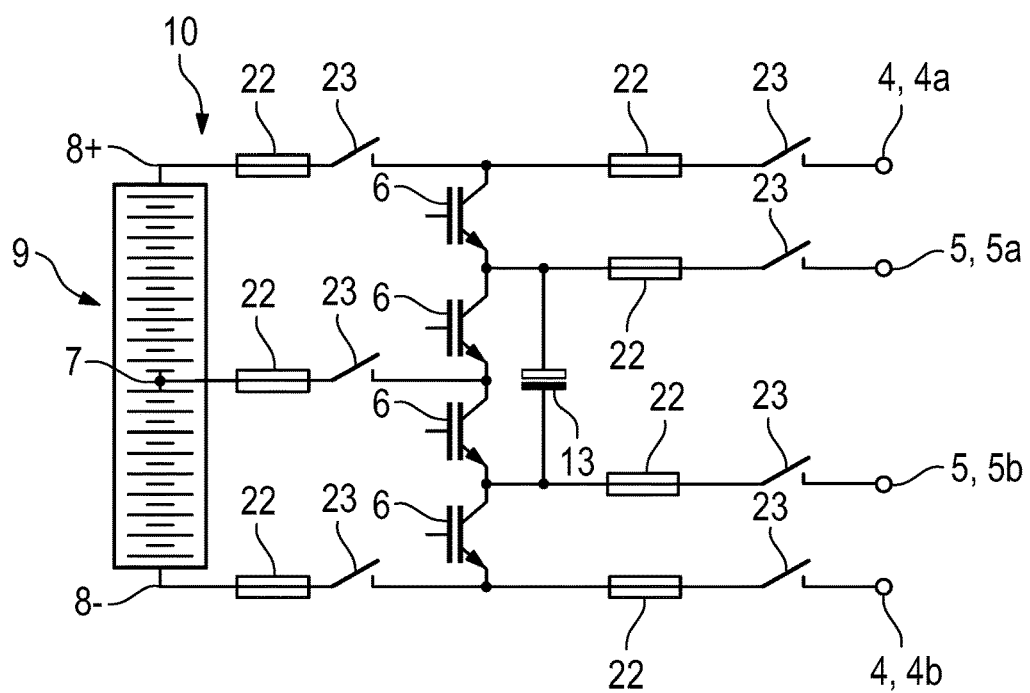

In the circuit of the battery system 10 according to the invention shown in FIG. 14, in addition to the battery taps 7, 8+, 8−, each of the output terminals 4a, 4b, 5a, 5b also has an electrical fuse 22 and an electrical contactor 23.

Figure 16:
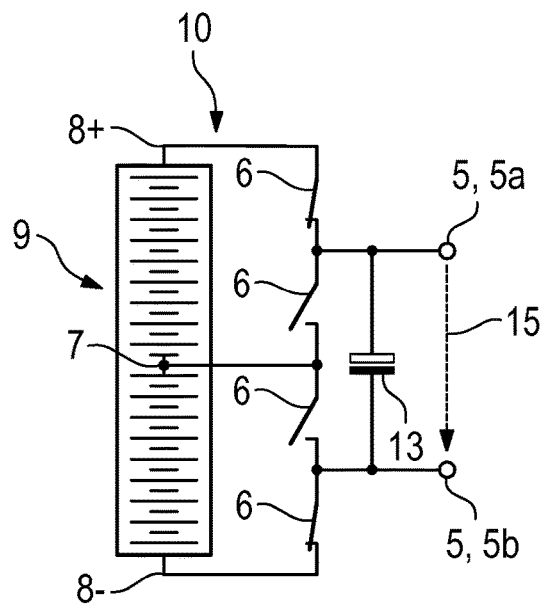
FIGS. 16 and 17 show an embodiment of the battery system in which a plurality of voltage levels may be present at a pair of output terminals.
Figure 17:
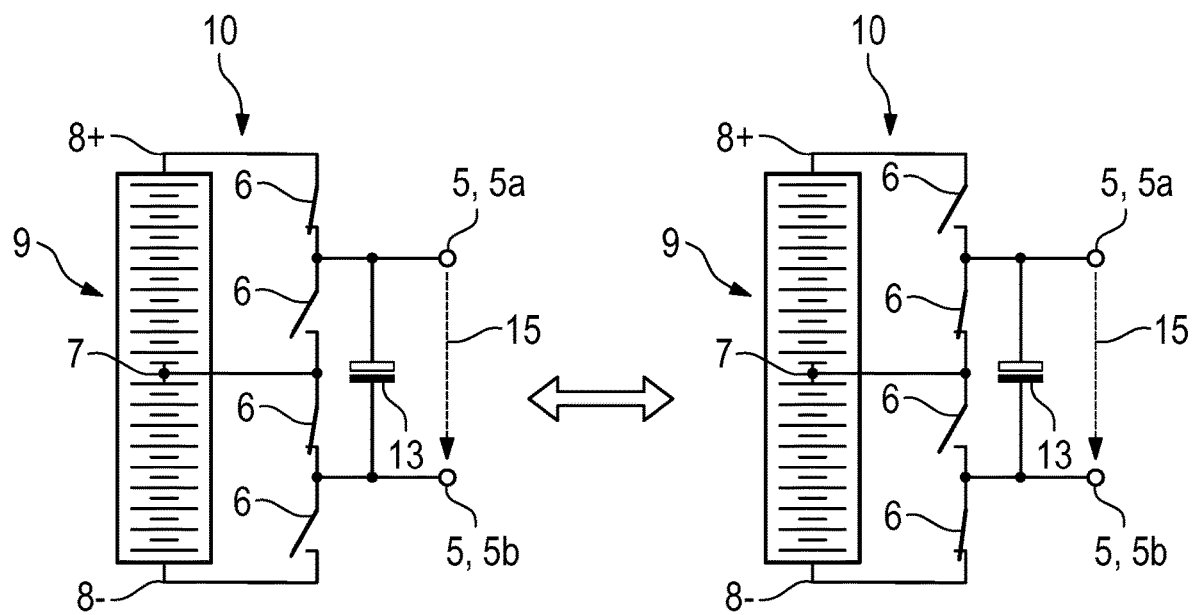

A further aspect of the battery system 10 according to the invention is illustrated with reference to FIGS. 16 and 17. According to the invention, more than one voltage 15 can occasionally be provided at a pair of output terminals 5a, 5b with a corresponding position of the electrical switches 6. In FIG. 16, a voltage 15 corresponding to the voltage between the positive pole 8+ and the negative pole 8− of the battery 9 is provided by positioning the electrical switches 6 between the output terminals 5a, 5b. FIG. 17 shows how a voltage 15 corresponding to the voltage of a battery element 1, 2 of the battery 9 can be provided by accordingly positioning the electrical switches 6 between the output terminals 5a, 5b. For this purpose, the voltage of the battery element 1 between the positive pole 8+ and a battery tap 7 of the battery can be provided at the pair of output terminals 5 in one switch position (left-hand side of FIG. 17). If the circuit switches to the other switch position (right-hand side of FIG. 17), the voltage 15 at the output terminals 5a, 5b corresponds to the voltage of the second battery element 2 between the battery tap 7 and the negative pole 8− of the battery. Accordingly, more than one voltage 15 can be provided at the pair of output terminals 4. Uniform loading of the battery 9 and/or others of the regulating goals mentioned above is/are achieved by suitably switching the electrical switches 6 back and forth.

For this purpose, the battery system 10 according to the invention is configured to detect which voltage is required or expected at the pairs of output terminals 4, 5 and uses the regulating or control unit 12 to set the electrical switches 6 such that the corresponding voltage is provided at the pairs of output terminals 4, 5. As already mentioned, a further vehicle electrical system or other units, for example electrical loads, electrical energy stores and/or electrical chargers, may be connected to the pairs of output terminals 4, 5. In order to detect which voltage is required or expected at the pairs of output terminals 4, 5, the battery system 10 according to the invention has voltage sensors 17, as shown in FIGS. 8a, 8b, 9a, 9b, 10a and 10b. The voltage is therefore measured at a pair of output terminals 5. During this measurement, all electrical switches 6 may also be deactivated in order to have the voltage 15 applied to the corresponding pair of output terminals 5 without distortion and to avoid changing it by means of paired electrical connection to parts of the battery 9 using the at least one electrical switch 6.

Alternatively, for this detection, at least one electronic signal 18 can be transmitted from at least one of the connected units mentioned to the at least one regulating or control unit 12 of the battery system 10 according to the invention, which provides the regulating or control unit 12 with indications of the correct voltage 15 so that the regulating or control unit 12 can instruct the switching unit 3 to accordingly activate or switch the electrical switches 6.

For example, according to this aspect of the invention, the same battery 9 can be used to carry out DC-voltage quick charging both with charging voltages, which are considerably below the total battery voltage and are accordingly dynamically alternately connected to different battery elements 1, 2, . . . , n, and with voltages which are the same as the total battery voltage and should therefore be connected to the positive and negative poles 8+, 8− of the battery 9.

In order to generate a more uniform flow of current over time, the circuits shown in FIGS. 18 to 21 have inductive elements or inductances 19.

Figure 18:
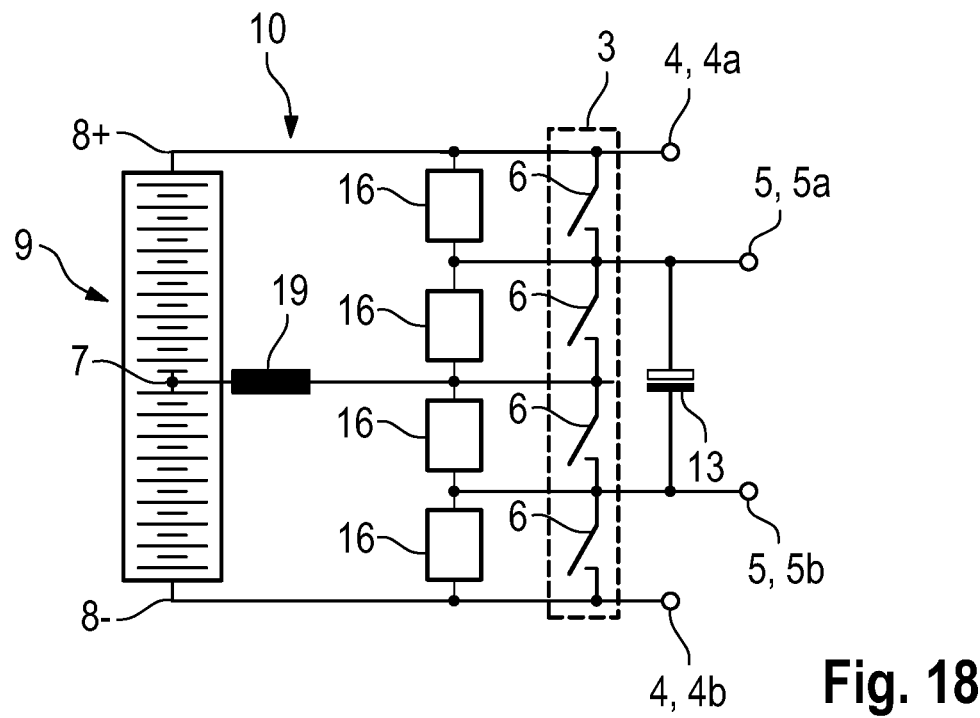
FIGS. 18 and 19 each show an embodiment of the battery system that has at least one inductive element at least at one battery tap.

In FIG. 18, an inductance 19 is arranged at a battery tap 7. The circuit in FIG. 18 additionally has an optional capacitance 13 at a pair of output terminals 5 and stabilizers 16.

Figure 19:
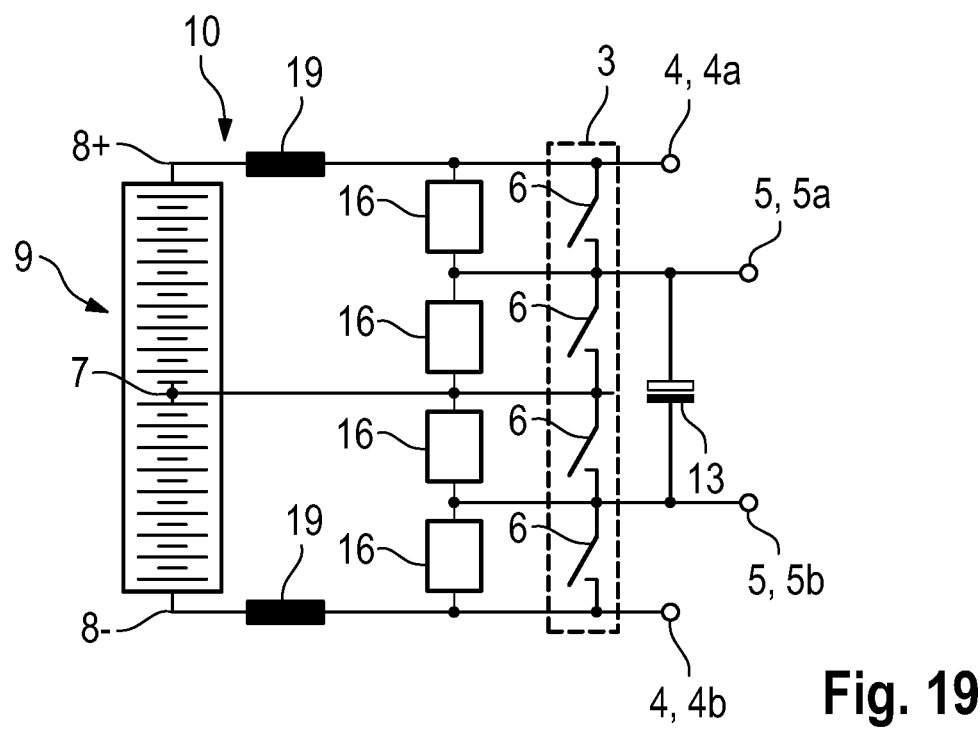

In FIG. 19, two inductances 19 are integrated in the circuit. One inductance 19 is arranged at the positive pole 8+ and a second inductance 19 is arranged at the negative pole 8− of the battery 9.

Figure 20:
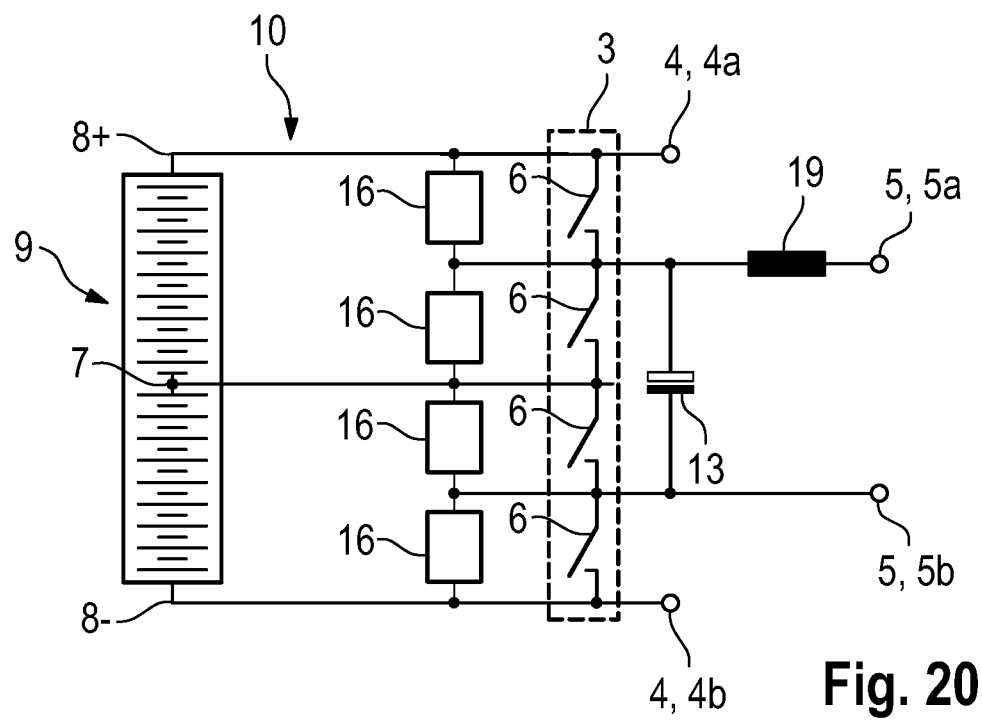
FIG. 20 shows an embodiment of the battery system according to the invention which has at least one inductive element at least at one pair of output terminals.

FIG. 20 has the inductance 19 at a pair of output terminals 5.

Figure 21:
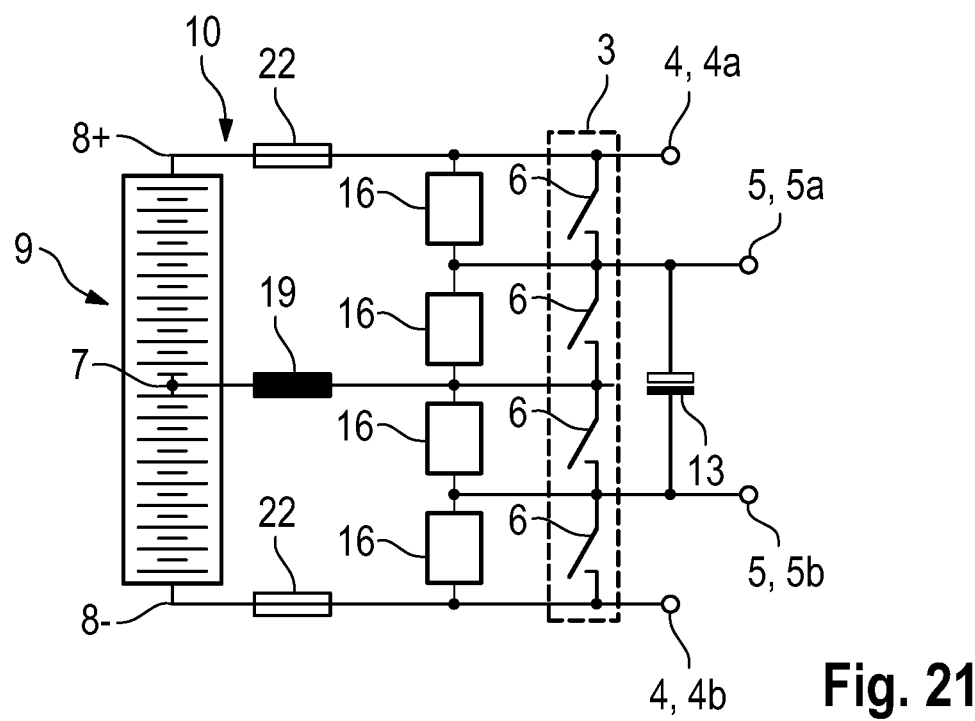
FIG. 21 shows an embodiment of the battery system according to the invention that has at least one inductive element and at least one electrical fuse and/or electrical contactor at least at one battery tap.

In FIG. 21, the battery system 10 according to the invention also has, in addition to the inductive element 19 in a battery tap 7, an electrical fuse 22 in a battery tap 8+, 8−. The electrical fuse 22 could also be replaced with an electrical contactor 23. Alternatively, an electrical fuse 22 and an electrical contactor 23 or combinations thereof could also be used.

In the embodiments shown, the inductance 19 is placed in this case in such a manner that at least one inductive element 19 is respectively placed in at least one battery tap 7, 8+, 8− such that each current path runs through one of the inductive elements 19 during alternate paired connection of at least one pair of output terminals 4, 5 to all pairs of battery taps 7, 8+, 8−.

The electrical voltage from the respective pair of output terminals 4, 5 is, at a first approximation, between the smallest voltage and the largest voltage which can be provided by the pairs of battery taps 7, 8+, 8−, between which the regulating or control unit 12 switches the respective pair of output terminals 4, 5 back and forth.

According to the invention, the regulating or control unit 12 may be designed to instruct the switching unit 3 to dynamically switch the pairs of output terminals 4, 5 back and forth over time between at least two non-identical pairs of battery taps 7, 8+, 8− using the switching elements 6, in which case not all of these pairs of battery taps 7, 8+, 8− or battery elements or subsets have approximately the same provided voltage. For example, the voltage provided by one pair of battery taps 7, 8+, 8− may differ by more than 20 percent from the voltages provided by the other pairs of battery taps 7, 8+, 8−, between which the switching unit 3 dynamically switches the pairs of output terminals 4, 5 back and forth over time. For example, the voltage provided by one pair of battery taps 7, 8+, 8− may also differ by more than 40 percent from the voltages provided by the other pairs of battery taps 7, 8+, 8−, between which the switching unit 3 switches the pairs of output terminals 4, 5 back and forth.

The regulating or control unit 12 also is designed to regulate or control a temporal residence time of the switches 6 in the respective position for connecting the pairs of output terminals 4, 5 to the pairs of battery taps 7, 8+, 8−. As a result, the electrical voltage from a pair of output terminals 4, 5 can be set on temporal average by suitably selecting the temporal residence time of the electrical connection between the pair of output terminals 4, 5 and one of the pairs of battery taps 7, 8+, 8−.

This aspect is illustrated with reference to FIG. 15. For example, the pairs of battery taps 7, 8+, 8− may be arranged on the battery 9 in such a manner that not every battery element 1, 2, 24 per se is uniformly loaded by a pair of output terminals 5-1, 5-2 or can be subjected to one of the conditions mentioned above. The circuit of the battery system 10 has three battery elements 1, 2, 24 which can be electrically connected to the pairs of output terminals 5-1 and 5-2 via electrical switches 6. The circuit additionally has the output terminals 4*a* and 4*b* which are accordingly electrically connected to the positive pole 8+ and the negative pole 8−. The pair of output terminals 5-1 can be electrically connected to the battery elements 1 and 2 connected in series (which then form a subset) or to the battery element 24 (which is then a subset per se) or to the three battery elements 1, 2, 24 connected in series (which then form a further subset). The pair of output terminals 5-2 may be electrically connected to the battery elements 2 and 24 connected in series (which then form a subset) or to the battery element 1 (which is then a subset per se) or to the three battery elements 1, 2, 24 connected in series (which then form a subset). If a plurality of battery taps 7 are combined with one another, charge can be exchanged among the individual battery elements 1, 2, 24 by transferring the charge to an intermediate module, for example. Such an intermediate module may be the battery element 2. If, for example, the pair of output terminals 5-1 is electrically connected to the battery element 24 and the pair of output terminals 5-2 is electrically connected to the battery element 1, a voltage 15-1 or 15-2 corresponding to a third of the total voltage of the battery 9 between the positive pole 8+ and the negative pole 8− is respectively provided at both pairs of output terminals 5-1, 5-2. However, the battery element 2 is not loaded, as a result of which the battery elements 1, 2, 24 are loaded in a non-uniform manner. However, the situation in which the battery elements 1, 2, 24 are uniformly loaded by virtue of the battery element 2, for example, being used to exchange charge between the battery elements 1, 2, 24 is achieved by accordingly dynamically switching back and forth over time between the combinations mentioned above and by means of a corresponding temporal residence time in the corresponding position. It should be noted that each battery element may be associated with one or more subsets and the subsets dynamically change after each switching operation and comprise different and/or identical battery elements.

Figure 15:
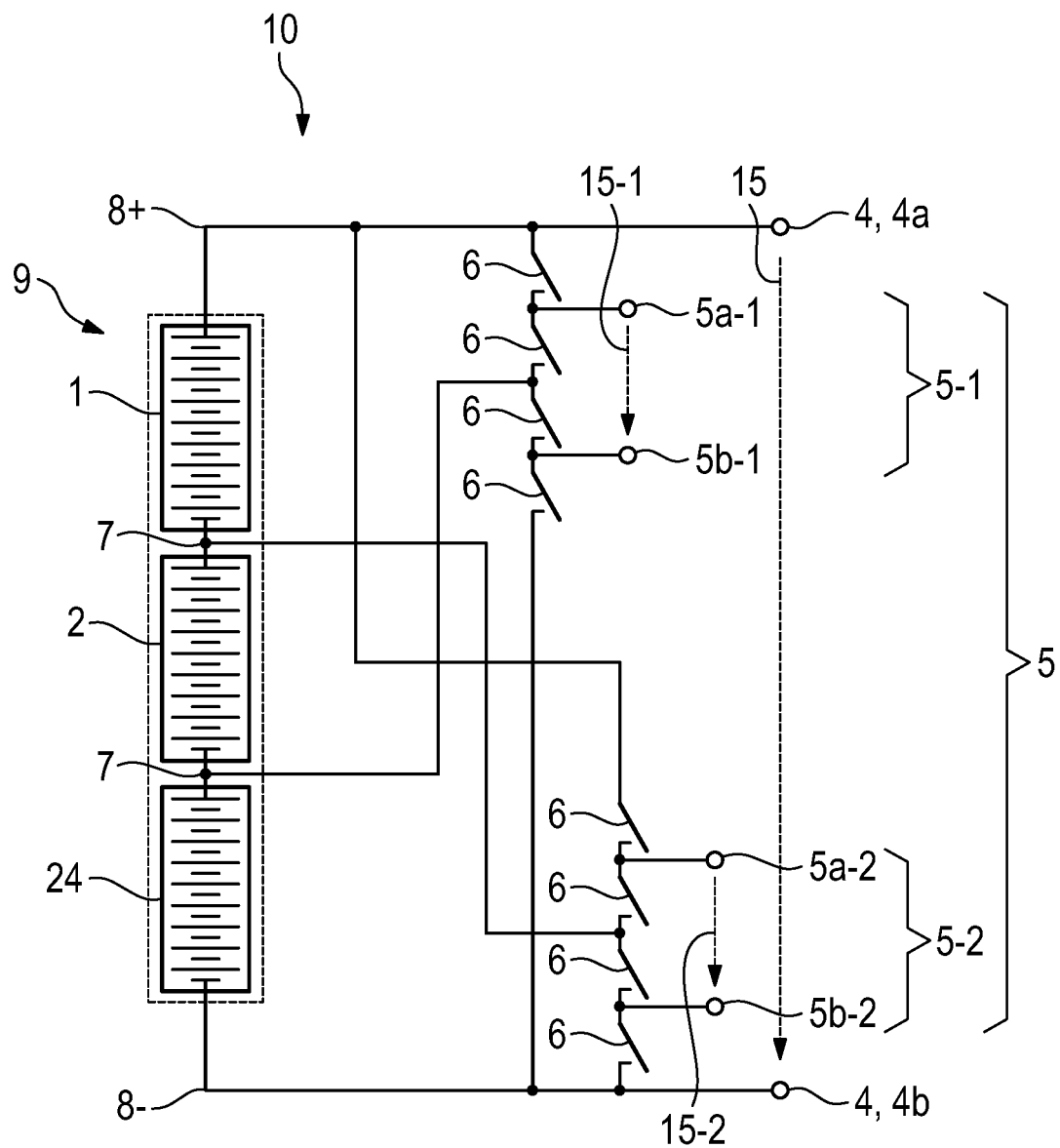
FIG. 15 shows an embodiment of the battery system according to the invention which makes it possible to uniformly load the battery or the battery elements.
Figure 22:
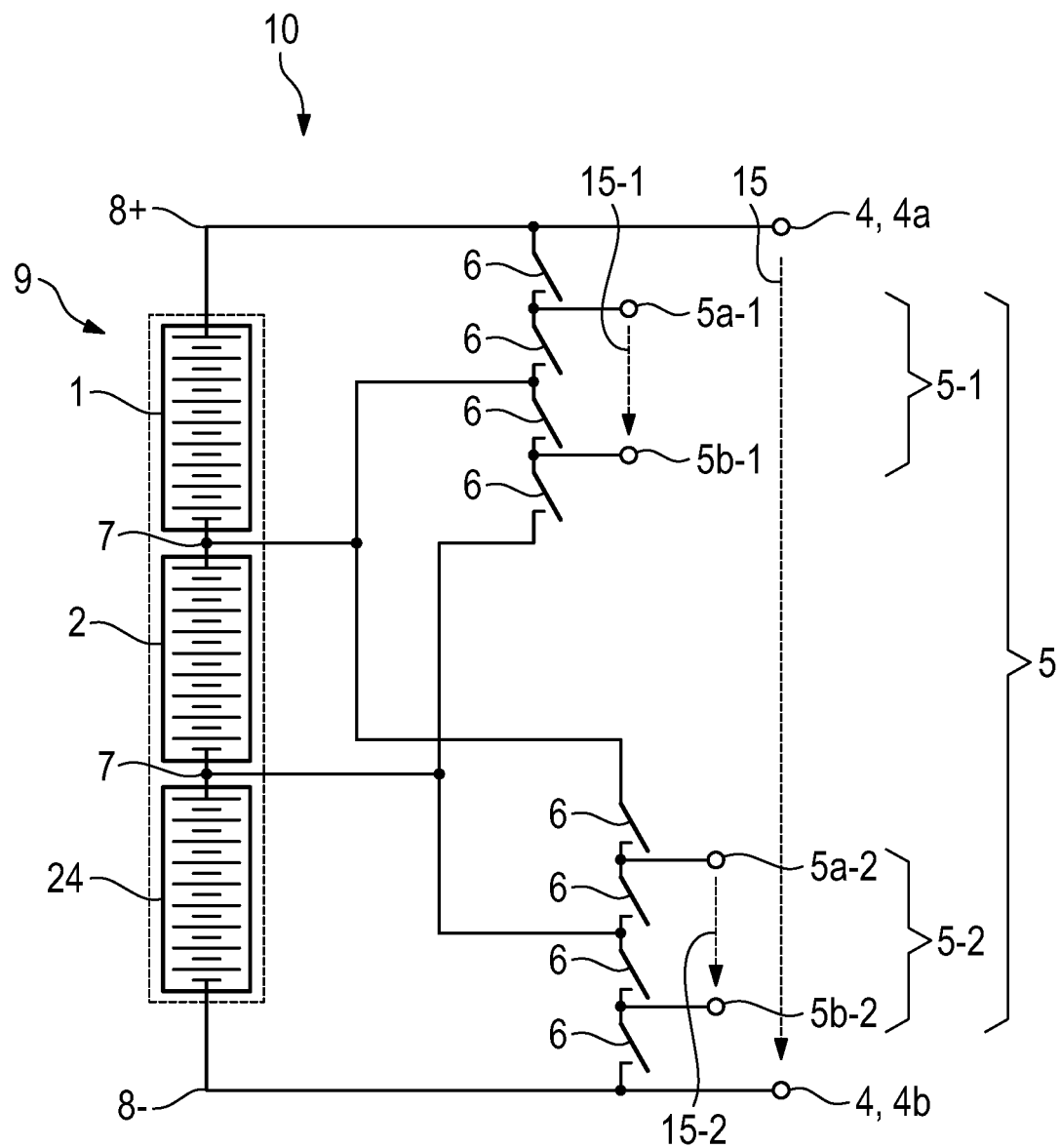
FIG. 22 shows an embodiment of the battery system in which at least two pairs of output terminals may each have occasionally different DC voltages as a result of a corresponding position of at least one electrical switch.

The circuit in FIG. 22 is an alternative to the circuit in FIG. 15. In this case too, the battery 9 is subdivided into three battery elements 1, 2, 24. In this case, the at least two pairs of output terminals 5-1, 5-2 may each have occasionally different DC voltages 15-1, 15-2 by means of a suitable position of at least one electrical switch 6. In contrast to FIG. 15, a voltage 15-1 which corresponds either only to the voltage of the first battery element 1 or only to the voltage of the second battery element 2 or to the voltage of the first and second battery elements 1, 2 connected in series can now be provided at the pair of output terminals 5-1 by means of a corresponding position of the electrical switches 6. The situation is similar with the voltage 15-2 which is provided at the pair of output terminals 5-2 and can correspond either only to the voltage of the third battery element 24 or only to the voltage of the second battery element 2 or to the voltage of the battery elements 2, 24 connected in series. The battery and the battery elements 1, 2, 24 can be uniformly loaded by accordingly dynamically switching back and forth between the battery taps 7, 8+, 8−.

For example, a battery 9 having nine electrically serial battery elements could be subdivided into two non-overlapping parts each with four battery elements (which then respectively form a subset) in order to produce in each case a pair of output terminals with half the battery voltage. However, a battery element (which also forms a subset) in this example is not included in any alternative, as a result of which it is not possible to uniformly load all battery elements even by deliberately selecting residence times in individual circuit states, and there is a singularity for this cell in the underlying system of equations.

In other words, the set of the smallest parts of a battery 9, for example the set of all individual battery elements 1, 2, 24 electrically connected in series, is considered to be the basis of a vector space. As a result, a vector with respect to this basis, which describes, for example, the voltage 15-1, 15-2 of the pair of output terminals 5-1, 5-2 as a linear combination of the voltages of the individual battery elements 1, 2, 24, consequently the basis vectors, can be determined for each switch position of the electrical switches 6 which connect a particular pair of output terminals 5-1, 5-2 to a particular pair of battery taps 7, 8+, 8− in pairs in an electrically conductive manner. If the set of all such vectors describing the connection of battery elements 1, 2, 24 with respect to the corresponding output terminal 5*a*-1, 5*b*-1, 5*a*-2, 5*b*-2 taken together has full rank for all used paired electrical connections of the affected pairs of output terminals 5-1, 5-2 to pairs of battery taps 7, 8+, 8−, this set spans the same vector space as the above-mentioned basis from the individual battery elements 1, 2, 24. In this case, corresponding equalization is possible by controlling and/or regulating the temporal residence times of these at least two pairs of output terminals 5-1, 5-2 with respect to their associated pairs of battery taps 7, 8+, 8−, to which the respective pair of output terminals 5-1, 5-2 can be electrically connected in pairs by means of electrical switches 6. In this case, the electrical powers of the individual pairs of output terminals 5-1, 5-2 involved in this equalization should not be considerably different on temporal average over a long period, that is to say of the order of magnitude of the discharging period of the battery 9.

Figure 23:
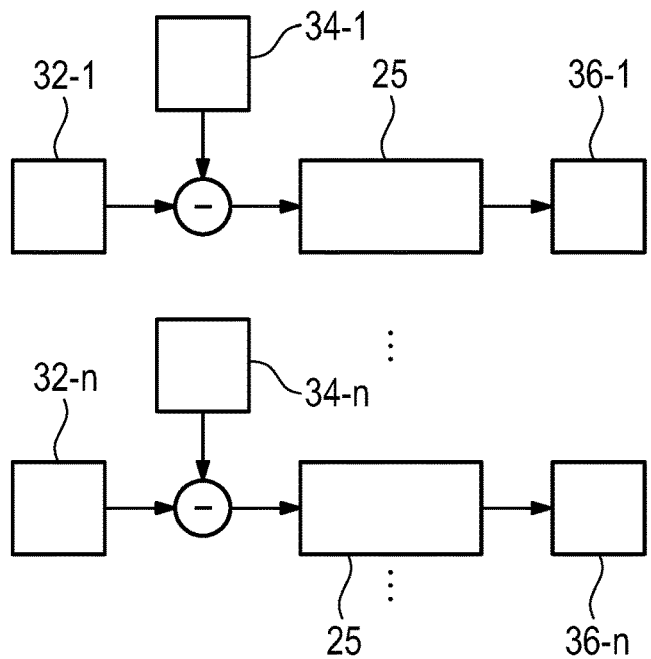
FIG. 23 shows regulation for at least one battery tap of an embodiment of the battery system according to the invention.

In this respect, FIG. 23 shows regulation 30 for a battery tap 7, 8+, 8−. For this purpose, a state variable 32-1, for example the real load of a battery element 7, 8+, 8− associated with a battery tap 7, 8+, 8−, and a regulating goal 34-1, for example an average load of all battery parts, are compared with one another once. A regulator 25, for example a PID regulator, then determines the proportional temporal residence time 36-1 in a pair of battery taps. This can be carried out for each of a number of any desired number of battery taps 7, 8+, 8−. If the pairs of battery taps 7, 8+, 8− assigned to a particular pair of output terminals 4, 5 are distributed over the battery 9 in such a manner that the battery elements 1, 2, 24 conceptually formed by the battery taps 7, 8+, 8− do not overlap, such equalization is provided by a residence time of the paired electrical connection of pairs of output terminals 4, 5 to each of the assigned pairs of battery taps 7, 8+, 8−, which residence time is the same on temporal average. This sequence may be cyclical for the sake of simplicity (so-called round-robin). Alternatively, it is also possible to use, for example, a stochastic sequence having distributions which are identical on average.

If the battery elements 1, 2, 24 formed by the pairs of battery taps 7, 8+, 8− are not disjoint in pairs, the increased load of the overlapping battery elements 1, 2, 24 should be taken into account.

Figure 24:
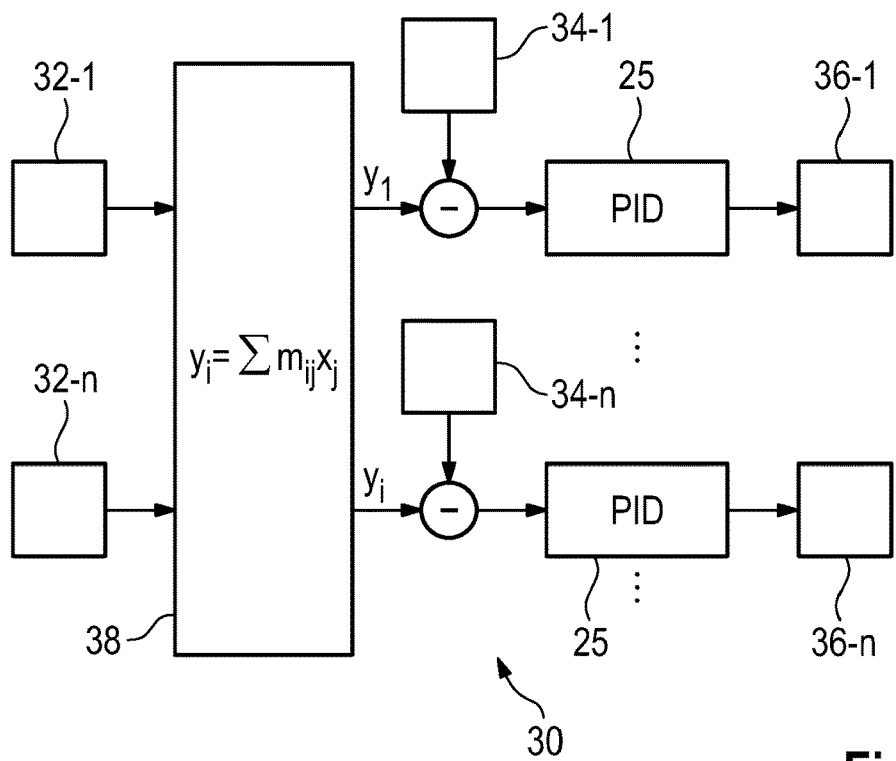
FIG. 24 shows further regulation for a battery tap of an embodiment of the battery system according to the invention.

FIG. 24 shows regulation 30 which processes a plurality of regulating goals and/or state variables 32-1 with their respective regulating goals using a linking matrix 38 with weighting factors mij. The state variables ("load") 32-1 may generally constitute all regulating goals mentioned in this description, for example charge, current, energy, temperature and the like.

The voltage of the respective pair of output terminals 4, 5 can also be approximated by a weighted linear combination of the voltages of the pairs of battery taps 7, 8+, 8−, between which the regulating or control unit 12 dynamically switches the output terminals 4, 5 back and forth over time, if the portion of the temporal residence times in the respective switching combination of the total time is used as weighting factors mij.

Electrical losses, for example losses in electrical switches 6, generally reduce the real voltage. This linear combination also provides an equation that, for given voltages, can be used to estimate suitable weighting factors mij and average residence times 36.

A uniform voltage can also be generated at the pair of output terminals by means of a suitable electrical filter. In FIGS. 8a, 8b, 9a, 9b, such a filter is implemented using inductances 19 and/or capacitances 13 installed in the circuit.

If a system of equations on the basis of the linear combination for given voltages is under-determined, that is to say a plurality of solutions which generate the desired voltages can be found, the average temporal residence times in particular switching combinations of pairs of output terminals 4, 5 and pairs of battery taps 7, 8+, 8− can also be used to optimize at least one secondary condition. Examples of a secondary condition are uniform discharging or charging of the battery parts 1, 2, 24, . . . , n (FIGS. 7 and 15) defined by the pairs of battery taps 7, 8+, 8− enclosing them, deliberately unequal discharging/charging, uniform or deliberately non-uniform ageing, uniform or deliberately non-uniform heating or temperature distribution, an identical or deliberately unequal voltage or an identical or deliberately unequal state of charge.

Figure 25:
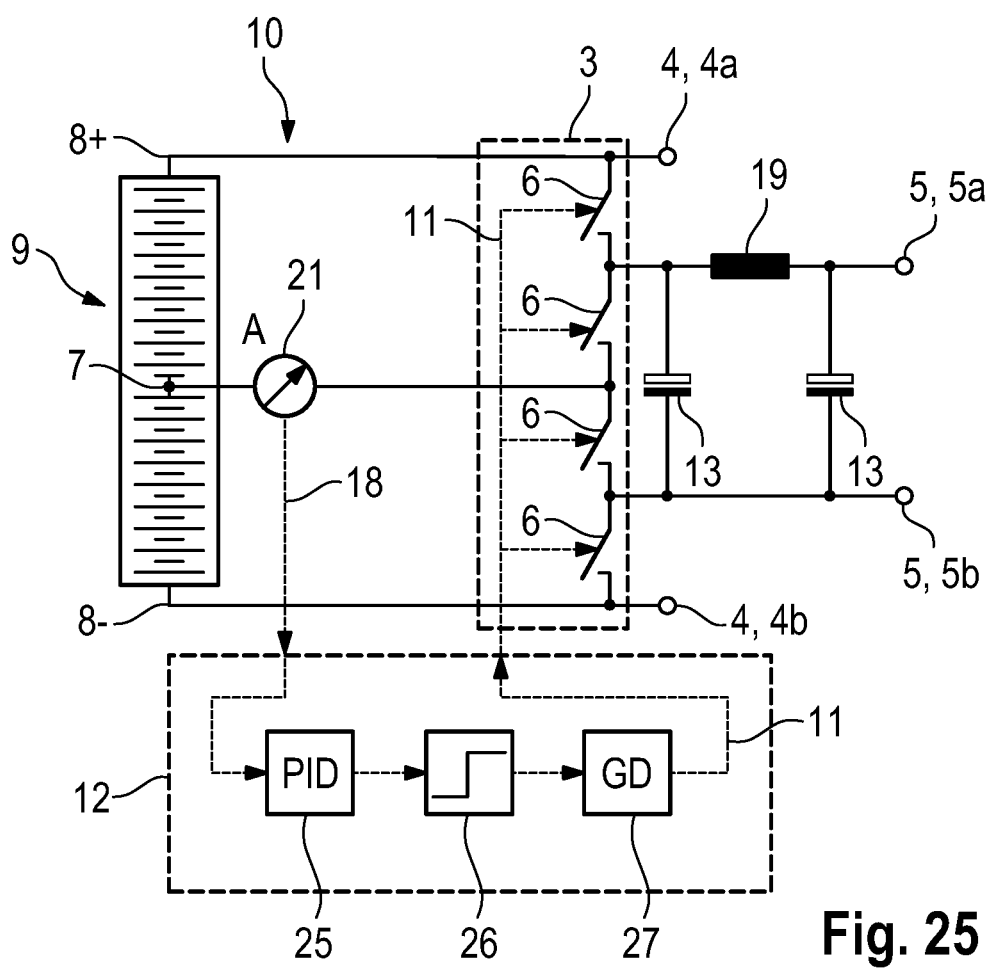
FIG. 25 shows an embodiment of the battery system in which at least one current sensor detects the inflowing and outflowing current of at least one battery tap and uses it to regulate or control the individual switches in the switching unit.

FIG. 25 shows a battery system 10 according to the invention having a current sensor 21 that detects the inflowing and outflowing current of a battery tap 7, for example a center tap, and is used to regulate individual switches 6 in the switching unit 3. The regulation may comprise, for example, at least one PID regulator 25 that attempts to regulate the respectively measured current to zero on temporal average, at least one discriminator 26, for example also a Schmitt trigger, and at least one gate driver unit 27. The regulator may be a PI regulator or a P regulator. By measuring the voltage of different battery elements 1, 2, 24 by a respectively associated voltage sensor 17, the regulating or control unit 12 can equalize voltage differences between battery elements 1, 2, 24 or can deliberately regulate particular battery elements 1, 2, 24 to different predefined voltages by selecting the changeover times of the connection between the corresponding pairs of output terminals 4, 5 and different combinations of battery taps 7, 8+, 8−. Accordingly, charge balances can be determined for corresponding battery elements 1, 2, 24 using current sensors 21 which measure inflowing and outflowing currents, and charge differences can be deliberately equalized or deliberately established by selecting the changeover times of the connection between the corresponding pairs of output terminals 4, 5 and different combinations of battery taps 7, 8+, 8−. However, other state variables of the battery elements 1, 2, 24 can also be equalized, for which further sensors are required. Temperature sensors, for example, which also make it possible to equalize temperature differences of the battery elements 1, 2, 24 are not shown.

As mentioned, according to the invention, a plurality of battery taps or each battery tap 7, 8+, 8− may have a voltage sensor 17, but the at least one switching element 6 according to the invention allows the voltage of all battery elements 1, 2, 24 to be determined using only one voltage sensor 17 by virtue of the at least one electrical switch 6, in addition to changing over the corresponding pairs of output terminals 4, 5 between different combinations of pairs of battery taps 7, 8+, 8−, performing the function of a measuring multiplexer and alternately connecting the voltage sensor 17 to different combinations of pairs of battery taps 7, 8+, 8−. The same applies to a current sensor 21.

The battery system 10 according to the invention and the regulation or control 30 according to the invention allow small electronics (small installation space, small volume, low weight) in comparison with conventional DC-DC converters and high load dynamics in comparison with conventional DC-DC converters which usually have a very limited regulating speed. The battery system according to the invention and the regulation or control according to the invention also have a high degree of reliability on account of few parts which may also be designed in a redundant manner.

The invention is not restricted to motor vehicles, but relates to all fields of application of batteries and other DC voltage sources and DC voltage stores that can be segmented into battery elements that can be combined to form a larger unit.

Without restricting the generality, the invention can be combined with other electronic circuits and can be supplemented with further electrical switching elements.

All exact voltage values are used only to illustrate the concepts and some embodiments and do not restrict the invention.

Furthermore, the described embodiments are used only to illustrate the invention. The invention is not restricted to the embodiments. The scope of the invention is given by the subsequent claims.

What is claimed is:

1. A battery system for providing a plurality of voltage levels for a corresponding plurality of load consumers, comprising:
    at least one battery including a plurality of battery elements, a positive pole forming a first battery tap, a negative pole forming a second battery tap, and at least one central battery tap arranged between the positive pole and the negative pole;
    a first distinct pair of output terminals, each of the output terminals of the first pair of output terminals being connectable selectively to the first and second battery taps and further being connectable to at least a first load;
    a second distinct pair of output terminals, each of the output terminals of the second pair of output terminals being connectable to the central battery tap and being connectable to at least a second load;
    at least one measuring device connected to at least one of the output terminals;
    a switching unit including at least four switching elements;
    at least one stabilizer coupled in parallel with one of the at least four switching elements between at least one battery tap and at least one output terminal, the at least one stabilizer configured to dynamically stabilize electrical potentials of the battery taps and/or the output terminals with respect to one another; and
    a regulating or control unit being connected to the switching unit and the at least one measuring device and configured to instruct the switching unit to dynamically switch at least selected ones of the switching elements to electrically connect or disconnect the selected ones of the output terminals of the first and second distinct pairs of output terminals to any two of the first and second battery taps and the central battery tap of the at least one battery based on measurements of the at least one measuring device as an indication of an expected or required voltage and to provide a separate voltage across selected ones of the output terminals of the first and second distinct pairs of output terminals, and wherein
    the at least four switching elements are configured to be switched to provide a partial voltage across at least selected ones of the first and second distinct pairs of output terminals, the partial voltage being different from the total voltage of the at least one battery that can be provided between the positive pole and the negative pole.

2. The battery system of claim 1, wherein the respective battery elements are configured to be deliberately loaded by achieving at least one predefined regulating goal.

3. The battery system of claim 1, wherein a different voltage level is providable for each of the plurality of load consumers via at least one of the pairs of output terminals, for which voltage level the respective load consumer is designed and configured.

4. The battery system of claim 1, wherein the regulating or control unit is configured to instruct the switching unit to switch the switching elements and to thereby switch back and forth between the battery taps in such a manner that the plurality of battery elements are deliberately loaded.

5. The battery system of claim 4, wherein at least one pair of output terminals provides a voltage that is different from the total voltage of the battery that can be provided between the positive pole and the negative pole.

6. The battery system of claim 5, in which at least one pair of output terminals has at least one switching element which alternately electrically connects the at least one pair of output terminals to at least two different combinations of the battery taps or disconnects said pair according to its switching direction.

7. The battery system of claim 6, wherein the regulating or control unit is configured to instruct the switching unit to switch the at least one switching element in such a manner that at least one pair of output terminals is configured to provide a plurality of different voltage levels based on the arrangement of the at least one switching element.

8. The battery system of claim 7, wherein the at least one switching element is a semiconductor switching element or a rectifying element.

9. The battery system of claim 7, wherein the battery taps subdivide the battery in such a manner that each battery element is surrounded by different pairs of battery taps.

10. The battery system of claim 7, wherein the regulating or control unit is configured to instruct the switching unit to change over between different combinations of battery taps at a changeover rate of less than 100 hertz (Hz).

11. The battery system of claim 10, wherein the regulating or control unit is configured to instruct the switching unit to change over between different combinations of battery taps at a changeover rate of less than 1 hertz (Hz).

12. The battery system of claim 1, further comprising electrical and/or electronic elements, the electrical and/or electronic elements are configured to influence the current flow and/or provided voltage of the at least two distinct output terminals.

13. The battery system of claim 1, wherein the regulating or control unit approximates the voltage to be provided by the at least one pair of output terminals by means of a weighted linear combination of the voltages from the pairs of battery taps, between which the regulating or control unit dynamically changes over time, and controls a temporal residence time of switching elements in a position for connecting the at least one pair of output terminals to the battery taps.

14. The battery system of claim 13, wherein the at least one regulating or control unit uses as the weighting factor, a portion of the temporal residence time in the respective switching combination of the pairs of battery taps between a pair of output terminals and the associated pairs of battery taps.

15. The battery system of claim 13, wherein if an under-determined linear combination is present, the at least one regulating or control unit is configured to optimize a further secondary condition and achieve at least one further regulating goal if an under-determined linear combination is present.

16. The battery system of claim 1, wherein the at least one measuring device comprises at least one voltage measuring device connected between at least two of the output terminals.

17. The battery system of claim 1, wherein the at least one measuring device comprises a current sensor connected to one of the output terminals.

18. The battery system of claim 17, wherein the at least one measuring device further comprises at least one voltage measuring device connected between at least two of the output terminals.

* * * * *